(12) United States Patent
Son et al.

(10) Patent No.: US 11,915,119 B2
(45) Date of Patent: Feb. 27, 2024

(54) CONVOLUTIONAL NEURAL NETWORK (CNN) PROCESSING METHOD AND APPARATUS PERFORMING HIGH SPEED AND PRECISION CONVOLUTION OPERATIONS

(71) Applicant: Samsung Electronics Co., Ltd., Suwon-si (KR)

(72) Inventors: Changyong Son, Anyang-si (KR); Jinwoo Son, Seoul (KR); Chang Kyu Choi, Seongnam-si (KR); Jaejoon Han, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1248 days.

(21) Appl. No.: 15/848,298

(22) Filed: Dec. 20, 2017

(65) Prior Publication Data

US 2018/0181858 A1 Jun. 28, 2018

(30) Foreign Application Priority Data

Dec. 22, 2016 (KR) .......................... 10-2016-0176617

(51) Int. Cl.
*G06N 3/08* (2023.01)
*G06N 3/044* (2023.01)
*G06N 3/045* (2023.01)
*G06N 3/063* (2023.01)

(52) U.S. Cl.
CPC ............ *G06N 3/044* (2023.01); *G06N 3/045* (2023.01); *G06N 3/08* (2013.01); *G06N 3/063* (2013.01)

(58) Field of Classification Search
CPC ...... G06N 3/0445; G06N 3/08; G06N 3/0454; G06N 3/063
See application file for complete search history.

(56) References Cited

U.S. PATENT DOCUMENTS

| | | | |
|---|---|---|---|
| 5,276,771 A * | 1/1994 | Manukian | G06F 18/2413 706/31 |
| 8,051,124 B2 | 11/2011 | Salama et al. | |
| 2015/0125049 A1 | 5/2015 | Taigman et al. | |
| 2015/0170021 A1* | 6/2015 | Lupon | G06N 3/0454 706/15 |

(Continued)

FOREIGN PATENT DOCUMENTS

| | | |
|---|---|---|
| KR | 10-0442835 B1 | 8/2004 |
| KR | 10-0980858 B1 | 9/2010 |

(Continued)

OTHER PUBLICATIONS

Amjad Almahairi and Nicolas Ballas and Tim Cooijmans and Yin Zheng and Hugo Larochelle and Aaron Courville, Dynamic Capacity Networks, arXiv:1511.07838, 2016 (Year: 2016).*

(Continued)

*Primary Examiner* — Jue Louie
(74) *Attorney, Agent, or Firm* — NSIP Law

(57) ABSTRACT

A convolutional neural network (CNN) processing method includes selecting a survival network in a precision convolutional network based on a result of performing a high speed convolution operation between an input and a kernel using a high speed convolutional network, and performing a precision convolution operation between the input and the kernel using the survival network.

43 Claims, 12 Drawing Sheets

(56) References Cited

U.S. PATENT DOCUMENTS

| | | | |
|---|---|---|---|
| 2016/0019456 A1* | 1/2016 | Annapureddy | G06N 3/084 |
| | | | 706/22 |
| 2016/0217369 A1 | 7/2016 | Annapureddy et al. | |
| 2017/0132496 A1* | 5/2017 | Shoaib | G06N 3/063 |
| 2018/0095728 A1* | 4/2018 | Hasenplaugh | G06F 1/3237 |
| 2019/0130245 A1* | 5/2019 | Sakaguchi | G06N 3/02 |

FOREIGN PATENT DOCUMENTS

| | | |
|---|---|---|
| KR | 10-1298393 B1 | 8/2013 |
| KR | 10-1563569 B1 | 10/2015 |
| KR | 10-2015-0145167 A | 12/2015 |
| KR | 10-2016-0069834 A | 6/2016 |
| KR | 10-2016-0075509 A | 6/2016 |
| KR | 10-2016-0088224 A | 7/2016 |
| KR | 10-2016-0091786 A | 8/2016 |
| KR | 10-16444998 B1 | 8/2016 |

OTHER PUBLICATIONS

Brandon Reagen et al., Minerva: Enabling Low-Power, Highly-Accurate Deep Neural Network Accelerators, ISCA, 2016 (Year: 2016).*

Max Jaderberg and Andrea Vedaldi and Andrew Zisserman, Speeding up Convolutional Neural Networks with Low Rank Expansions, arXiv:1405.3866, 2014 (Year: 2014).*

Courbariaux et al. "Training Deep Neural Network with Low Precision Multiplications", 2015, arXiv:1412.7024.*

Zhang et al. "ApproxANN: An Approximate Computing Framework for Artificial Neural Network", 2015, 2015 Design, Automation & Test in Europe Conference & Exhibition.*

Shan et al., "A Dynamic Multi-precision Fixed-Point Data Quantization Strategy for Convolutional Neural Network", Dec. 9, 2016, Communications in Computer and Information Science, vol. 666.*

Bhattacharya et al. "Sparsification and Separation of Deep Learning Layers for Constrained Resource Inference on Wearables", Nov. 14-16, 2016, SenSys '16.*

Lebedev, Vadim, et al. "Speeding-up Convolutional Neural Networks Using Fine-Tuned CP-Decomposition." *Proceedings of the $3^{rd}$ International Conference on Learning Representation*, May 2015, ArXiv:1412.6553V3, (11 pages in English).

Chen, Yu-Hsin, et al. "Eyeriss: An Energy-Efficient Reconfigurable Accelerator for Deep Convolutional Neural Networks," *IEEE Journal of Solid-State Circuits; Proceedings of the IEEE International Solid-State Circuits Conference, Session 14*, February (3 pages in English).

Almahairi, Amjad, et al., "Dynamic Capacity Networks." *Proceedings of the $33^{rd}$ International Conference on Machine Learning*, vol. 48, Jun. 2016 (10 pages in English).

Albericio, Jorge, et al., "Cnvlutin: Ineffectual-Neuron-Free Deep Neural Network Computing", *Proceedings of the 2016 ACM/IEEE 43rd Annual International Symposium on Computer Architecture (ISCA)*, Jun. 2016 (pp. 1-13).

Dong, Xuanyi, et al., "More is Less: A More Complicated Network with Less Inference Complexity", *Proceedings of the 2017 IEEE Conference on Computer Vision and Pattern Recognition (CVPR)*, Jul. 2017 (pp. 1895-1903).

Delmas, Alberto, et al. "Tartan: Accelerating Fully-Connected and Convolutional Layers in Deep Learning Networks by Exploiting Numerical Precision Variability", *ICLR 2017*, Cornell University Library, arXiv preprint arXiv:1707.09068, 2017 (pp. 1-14).

Extended European Search Report dated Jun. 20, 2018 in corresponding European Application No. 17207744.8 (9 pages in English).

* cited by examiner

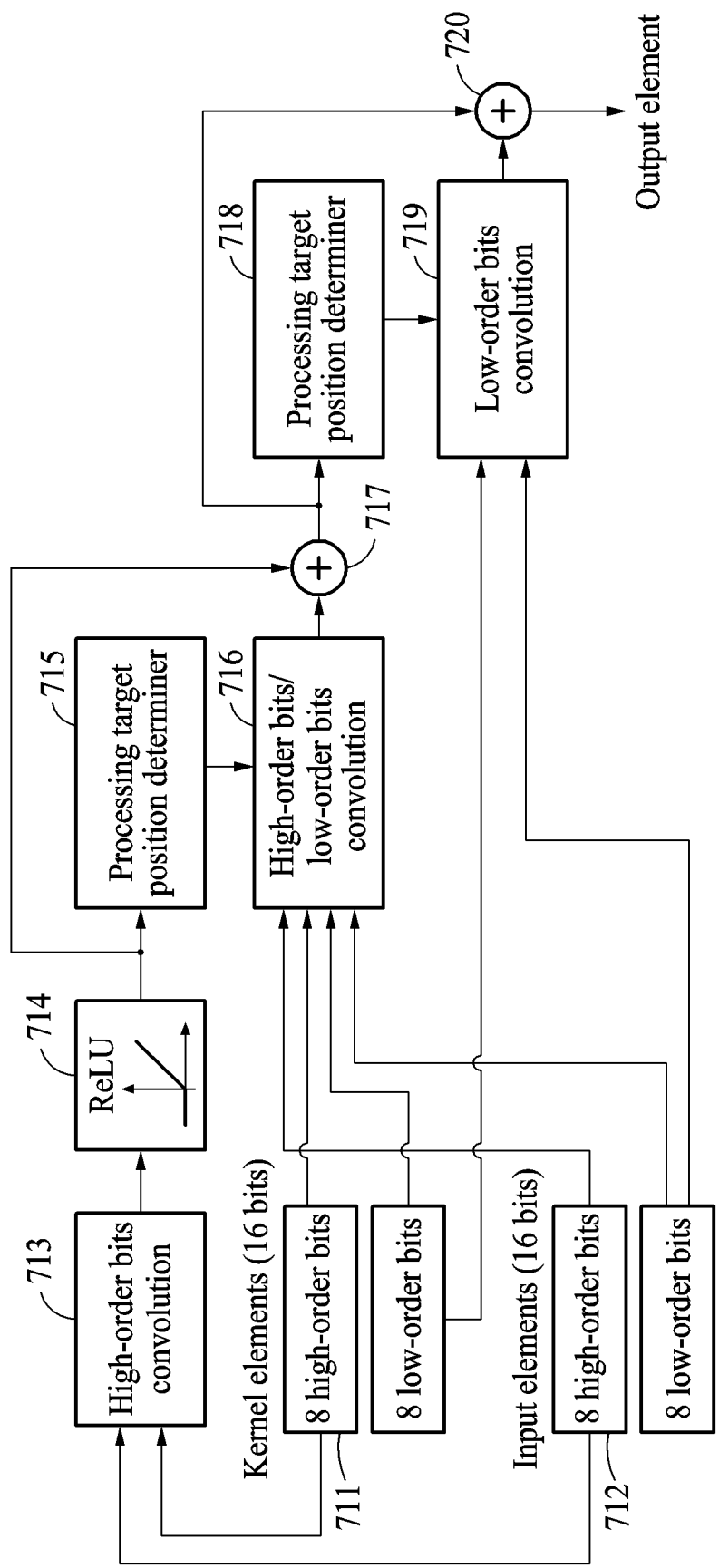

CONVOLUTIONAL NEURAL NETWORK (CNN) PROCESSING METHOD AND APPARATUS PERFORMING HIGH SPEED AND PRECISION CONVOLUTION OPERATIONS

CROSS-REFERENCE TO RELATED APPLICATIONS

This application claims the benefit under 35 USC 119(a) of Korean Patent Application No. 10-2016-0176617 filed on Dec. 22, 2016, in the Korean Intellectual Property Office, the entire disclosure of which is incorporated herein by reference for all purposes.

BACKGROUND

1. Field

The following description relates to convolutional neural network (CNN) processing technology.

2. Description of Related Art

Neural network-based deep learning technology is utilized in various fields. For example, deep learning-based biometric recognition/authentication applications that recognize faces, irises, and voices are employed by embedded terminals, for example, smart phones. A CNN is a multilayer neural network that utilizes a convolution operation, and exhibits an excellent performance in the field of deep learning-based image and voice recognition.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented convolutional neural network (CNN) processing method includes selecting a survival network in a precision convolutional network based on a result of performing a high speed convolution operation between an input and a kernel using a high speed convolutional network; and performing a precision convolution operation between the input and the kernel using the survival network.

The selecting may include obtaining an index of an input element and an index of a kernel element based on the result of the high speed convolution operation, the input element and the kernel element each contributing to the precision convolution operation; and selecting the survival network based on the index of the input element and the index of the kernel element.

The selecting may include obtaining an approximate output by performing the high speed convolution operation; selecting an output element contributing to the precision convolution operation from output elements of the approximate output; and backwardly selecting a survival network associated with the selected output element in the precision convolutional network.

The selecting of the output element may include performing a rectified linear unit (ReLU) operation on the output elements of the approximate output using an ReLU layer; and selecting an output element having a non-zero value from output elements of a result of the ReLU operation.

The selecting of the output element may include performing a comparison operation to determine whether the output elements of the approximate output exceed a threshold; and selecting an output element having a non-zero value from output elements of the approximate output determined to exceed the threshold in the comparison operation.

The selecting of the output element may include performing a rectified linear unit (ReLU) operation on the output elements of the approximate output using an ReLU layer; performing a max pooling operation on output elements of a result of the ReLU operation using a max pooling layer; and selecting, from output elements of a result of the max pooling operation, an output element having a representative value representative of a region of output elements of the result of the ReLU operation.

The selecting of the output element may include performing a rectified linear unit (ReLU) operation on the output elements of the approximate output using an ReLU layer; grouping output elements of a result of the ReLU operation into at least one group; and selecting, from the output elements in the group, an output element having a maximum value among output elements having non-zero values in the group, or an output element having a value less than the maximum value by a difference less than a threshold.

The selecting of the output element may include performing a comparison operation to determine whether the output elements of the approximate output exceed a first threshold; grouping output elements of the approximate output determined to exceed the first threshold in the comparison operation into at least one group; and selecting, from the output elements in the group, an output element having a maximum value among output elements having non-zero values in the group, or an output element having a value less than the maximum value by a difference less than a second threshold.

The selecting may include obtaining an approximate output by performing the high speed convolution operation; selecting an output element contributing to the precision convolution operation from output elements of the approximate output; and selecting the survival network by backwardly eliminating a redundant network not associated with the selected output element from the precision convolutional network.

The selecting may include performing the high speed convolution operation by performing sequential convolution operations between the input and sub-kernels generated by decomposing the kernel.

The performing of the sequential convolution operations may include performing a first convolution operation between the input and a first sub-kernel of the sub-kernels; and performing a second convolution operation between a result of the first convolution operation and a second sub-kernel of the sub-kernels.

The sub-kernels may be defined to minimize a difference between a result of a rectified linear unit (ReLU) operation performed on a result of the sequential convolution operations between the input and the sub-kernels and a result of an ReLU operation performed on a result of a convolution operation between the input and the kernel.

The sub-kernels may be defined to minimize a difference between a result of the sequential convolution operations between the input and the sub-kernels and a result of a rectified linear unit (ReLU) operation performed on a result of a convolution operation between the input and the kernel.

The performing of the high speed convolution operation may include performing a convolution operation between high-order bits of an input element of the input and high-order bits of a kernel element of the kernel.

The performing of the high speed convolution operation may include separating the input into a high-order bits input corresponding to high-order bits of the input and a low-order bits input corresponding to low-order bits of the input; separating the kernel into a high-order bits kernel corresponding to high-order bits of the kernel and a low-order bits kernel corresponding to low-order bits of the kernel; and performing a convolution operation between the high-order bits input and the high-order bits kernel.

The performing of the precision convolution operation may include performing a second convolution operation between the high-order bits input and the low-order bits kernel; performing a third convolution operation between the low-order bits input and the high-order bits kernel; performing a fourth convolution operation between the low-order bits input and the low-order bits kernel; and combining a result of the high speed convolution operation, a result of the second convolution operation, a result of the third convolution operation, and a result of the fourth convolution operation.

The kernel may include at least one filter; the filter may include at least one kernel map corresponding to at least one input channel, the kernel map including kernel elements; the input may include at least one input feature map corresponding to the input channel, the input feature map including input elements; the performing of the high speed convolution operation may include performing a first operation between a first portion of kernel elements in a first kernel map corresponding to a first input channel and at least one input element corresponding to the first portion, performing a second operation between a second portion of kernel elements in a second kernel map corresponding to a second input channel and at least one input element corresponding to the second portion after the first operation is performed, and generating an output element corresponding to the first kernel map and the second kernel map based on a result of the first operation and a result of the second operation; and the selecting may include selecting the survival network based on the output element.

The performing of the high speed convolution operation may include performing the high speed convolution operation using an approximation algorithm of a matrix multiplication operation.

In another general aspect, a non-transitory computer-readable medium stores instructions that, when executed by a processor, control the processor to perform the method described above.

In another general aspect, a processor-implemented convolutional neural network (CNN) processing method includes generating an approximate output by performing a high speed convolution operation between an input and a kernel; selecting a survival network in a convolutional layer based on the approximate output; and performing a precision convolution operation between the input and the kernel using the survival network.

The selecting may include selecting an output element contributing to the precision convolution operation from output elements of the approximate output; and backwardly selecting a survival network associated with the selected output element from networks in the convolutional layer.

The backwardly selecting of the survival network may include selecting the survival network based on an input element associated with the selected output element and a kernel element associated with the selected output element.

The selecting of the output element may include performing a rectified linear unit (ReLU) operation on the output elements of the approximate output using an ReLU layer; and selecting an output element having a non-zero value from output elements of a result of the ReLU operation.

The selecting of the output element may include performing a comparison operation to determine whether the output elements of the approximate output exceed a threshold; and selecting an output element having a non-zero value from output elements of the approximate output determined to exceed the threshold in the comparison operation.

The selecting of the output element may include performing a rectified linear unit (ReLU) operation on the output elements of the approximate output using an ReLU layer; performing a max pooling operation on output elements of a result of the ReLU operation using a max pooling layer; and selecting, from output elements of a result of the max pooling operation, an output element having a representative value representative of a region of output elements of the result of the ReLU operation.

The selecting of the output element may include performing a rectified linear unit (ReLU) operation on the output elements of the approximate output using an ReLU layer; grouping output elements of a result of the ReLU operation into at least one group; and selecting, from the output elements in the group, an output element having a maximum value among output elements having non-zero values in the group, or an output element having a value less than the maximum value by a difference less than a threshold.

The selecting of the output element may include performing a comparison operation to determine whether the output elements of the approximate output exceed a first threshold; grouping output elements of the approximate output determined to exceed the first threshold in the comparison operation into at least one group; and selecting, from the output elements in the group, an output element having a maximum value among output elements having non-zero values in the group, or an output element having a value less than the maximum value by a difference less than a second threshold.

The generating of the approximate output may include performing sequential convolution operations between the input and sub-kernels generated by decomposing the kernel.

The generating of the approximate output may include generating the approximate output based on high-order bits of an input element of the input and high-order bits of a kernel element of the kernel.

The kernel may include at least one filter; the filter may include at least one kernel map corresponding to at least one input channel, the kernel map including kernel elements; the input may include at least one input feature map corresponding to the input channel, the input feature map including input elements; the generating of the approximate output may include performing a first operation between a first portion of kernel elements in a first kernel map corresponding to a first input channel and at least one input element corresponding to the first portion, performing a second operation between a second portion of kernel elements in a second kernel map corresponding to a second input channel and at least one input element corresponding to the second portion after the first operation is performed, and generating an output element corresponding to the first kernel map and the second kernel map based on a result of the first operation and a result of the second operation; and the selecting may include selecting the survival network in the convolutional layer based on the output element.

In another general aspect, a processor-implemented convolutional neural network (CNN) processing method includes performing a convolution operation between high-order bits of an input element of an input and high-order bits of a kernel element of a kernel; and performing a high speed convolution operation between the input and the kernel based on a result of the convolution operation.

The performing of the convolution operation may include separating the input into a high-order bits input corresponding to high-order bits of the input and a low-order bits input corresponding to low-order bits of the input; separating the kernel into a high-order bits kernel corresponding to high-order bits of the kernel and a low-order bits kernel corresponding to low-order bits of the kernel; and performing a first convolution operation between the high-order bits input and the high-order bits kernel.

The performing of the high speed convolution operation may further include performing a second convolution operation between the high-order bits input and the low-order bits kernel; performing a third convolution operation between the low-order bits input and the high-order bits kernel; performing a fourth convolution operation between the low-order bits input and the low-order bits kernel; and combining a result of the first convolution operation, a result of the second convolution operation, a result of the third convolution operation, and a result of the fourth convolution operation.

In another general aspect, a convolutional neural network (CNN) processing apparatus includes a processor configured to select a survival network in a precision convolutional network based on a result of performing a high speed convolution operation between an input and a kernel using a high speed convolutional network, and perform a precision convolution operation between the input and the kernel using the survival network.

In another general aspect, a convolutional neural network (CNN) processing apparatus includes a processor configured to generate an approximate output by performing a high speed convolution operation between an input and a kernel, select a survival network in a convolutional layer based on the approximate output, and perform a precision convolution operation between the input and the kernel using the survival network.

In another general aspect, a convolutional neural network (CNN) processing apparatus includes a processor configured to perform a convolution operation between high-order bits of an input element of an input and high-order bits of a kernel element of a kernel, and perform a high speed convolution operation between the input and the kernel based on a result of the convolution operation.

In another general aspect, a convolutional neural network (CNN) processing apparatus includes a processor configured to perform a first convolution operation between a first part of an input and a first part of a kernel, and perform a second convolution operation between a second part of the input and a second part of the kernel in response to a result of the first convolution operation meeting a predetermined criterion.

A combination of the first part of the input and the second part of the input may be an entirety of the input; and a combination of the first part of the kernel and the second part of the kernel may be an entirety of the kernel.

A sum of processing resources required to perform the first convolution operation and processing resources required to perform the second convolution operation may be less than processing resources required to perform a convolution operation between the entirety of the input and the entirety of the kernel.

A sum of a processing time required to perform the first convolution operation and a processing time required to perform the second convolution operation may be less than a processing time required to perform a convolution operation between the entirety of the input and the entirety of the kernel.

The first part of the input may be high-order bits of the input; the first part of the kernel may be high-order bits of the kernel; the second part of the input may be low-order bits of the input; and the second part of the kernel may be low-order bits of the kernel.

The kernel may include a kernel map having a size of K×K kernel elements; and the first part of the kernel may be a sub-kernel map having a size of 1×1 or 1×K or K×1 kernel elements selected from the K×K kernel elements of the kernel map.

The input may be an image or a voice; and the processor may be further configured to perform a recognition operation or an authentication operation based on a combination of a result of the first convolution operation and a result of the second convolution operation.

Other features and aspects will be apparent from the following detailed description, the drawings, and the claims.

BRIEF DESCRIPTION OF THE DRAWINGS

FIG. 7C is a diagram illustrating another example of a high speed convolution operation.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
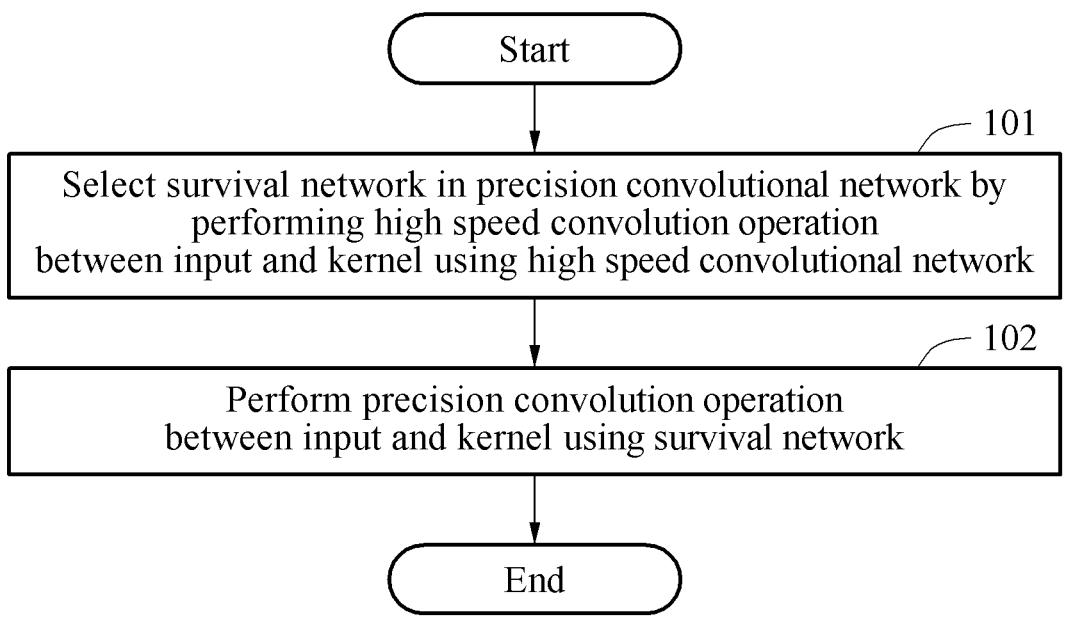
FIG. 1 is a flowchart illustrating an example of a convolutional neural network (CNN) processing method.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Terms such as first, second, A, B, (a), (b) may be used herein to describe components. However, such terms are not used to define an essence, order, or sequence of a corresponding component, but are used merely to distinguish the corresponding component from other components. For example, a component referred to as a first component may be referred to instead as a second component, and another component referred to as a second component may be referred to instead as a first component.

If the specification states that a first component is "connected," "coupled," or "joined" to a second component, the first component may be directly "connected," "coupled," or "joined" to the second component, or a third component may be "connected," "coupled," or "joined" between the first component and the second component. However, if the specification states that a first component is "directly connected" or "directly joined" to a second component, a third component may not be "connected" or "joined" between the first component and the second component. Similar expressions, for example, "between" and "immediately between" and "adjacent to" and "immediately adjacent to," are also to be construed in this manner.

The terminology used herein is for the purpose of describing particular examples only, and is not intended to limit the disclosure or claims. The singular forms "a," "an," and "the" include the plural forms as well, unless the context clearly indicates otherwise. The terms "comprises," "comprising," "includes," and "including" specify the presence of stated features, numbers, operations, elements, components, or combinations thereof, but do not preclude the presence or addition of one or more other features, numbers, operations, elements, components, or combinations thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

This application describes examples of an acceleration algorithm for a convolutional neural network (CNN) that enables high speed processing of a recognition or authentication operation in an embedded system with limited resources such as a terminal or smart phone without causing a decrease in performance. Recognition technology using a convolutional neural network (CNN) according to the examples may operate in a terminal or smart phone environment of limited resources, and provide a robust performance in various environments. For example, a CNN processing technique according to the examples may be implemented to respond within a limited time in a TrustZone of a smart phone. The CNN processing technique may be implemented using only limited computing resources, for example, using a single core. In a CNN that applies a matrix multiplication operation to input data, the CNN processing technique enables high speed CNN processing by reducing an operation count.

FIG. 1 is a flowchart illustrating an example of a convolutional neural network (CNN) processing method.

Referring to FIG. 1, in operation 101, a CNN processing apparatus selects a survival network in a precision convolutional network by performing a high speed convolution operation between an input and a kernel using a high speed convolutional network. The high speed convolutional network is a convolutional network used in performing the high speed convolution operation. In machine learning, a CNN, which is a type of neural network, includes convolutional layers that perform a convolution operation. The convolutional layers of the CNN perform a convolution operation between the input and the kernel. Each of the convolutional layers may perform a convolution operation based on a respective kernel for that convolutional layer, and the output of one convolutional layer may be an input for a next convolutional layer. The CNN processing apparatus loads the kernel or the input from a database that is established in advance. The database may be implemented as a memory included in the CNN processing apparatus, or as an external device, such as a server, to be connected to the CNN processing apparatus in a wired or wireless manner or through a network.

A convolutional layer includes the high speed convolutional network and the precision convolutional network. The CNN processing apparatus performs the high speed convolution operation using the high speed convolutional network, and performs a precision convolution operation using the precision convolutional network. The high speed convolution operation is a convolution operation that is performed at a relatively high speed compared to the precision convolution operation. The high speed convolution operation between the input and the kernel is performed using a simplified convolution operation technique or algorithm, and an approximate output is generated. The high speed convolution operation has a relatively high operating and processing speed compared to the precision convolution operation. For example, the high speed convolution operation is performed by omitting or simplifying an operation or a portion of variables for performing the precision convolution operation. Thus, the precision convolution operation is more precise than the high speed convolution operation.

The approximate output generated by the high speed convolution operation is an approximation of an output generated by the precision convolution operation. There is a trade-off relationship between an accuracy of the approximation and an operating speed of the high speed convolution operation. As the accuracy of the approximation increases, the operating speed of the high speed convolution operation decreases. Conversely, as the accuracy of the approximation decreases, the operating speed of the high speed convolution increases. A criterion for distinguishing between the high speed convolution operation and the precision convolution operation is an operation count or an operating or processing speed. For example, the high speed convolution operation and the precision convolution operation may have the same data load count, but may have different operating or processing speeds. The data load count includes a load count of information related to the input and the kernel for the convolution operation.

The CNN processing apparatus is an apparatus for processing a CNN, and is implemented as hardware. For example, the hardware of the CNN processing apparatus generates or processes operations and instructions associated with the CNN. The CNN processing apparatus may be provided in various computing devices and/or systems such as a smart phone, a tablet computer, a laptop computer, a desktop computer, a television, a wearable device, a security system, and a smart home system. For example, the CNN processing apparatus may be implemented by a processor executing instructions that, when executed by the processor, cause the processor to perform the operations of the CNN processing apparatus. The processor may be a processor of a computing device or system in which the CNN processing apparatus is provided, or may be a separate processor. However, these are merely examples, and the CNN processing apparatus may have other structures.

In operation 102, the CNN processing apparatus performs a precision convolution operation between the input and the kernel using the selected survival network. The CNN processing apparatus performs the precision convolution operation based on a result of the high speed convolution operation. In this example, the CNN processing apparatus supplements an accuracy of the high speed convolution operation and supplements a speed of the precision convolution operation, and thus increases the accuracy performance and the speed performance of the overall convolution operation between the input and the kernel.

A method of selecting a survival network by performing a high speed convolution operation will be described with reference to FIGS. 2 through 4. An example of a structure of convolutional layers constituting a CNN will be described with reference to FIG. 5. Examples of a high speed convolution operation will be described in detail with reference to FIGS. 6 through 7C.

Figure 2:
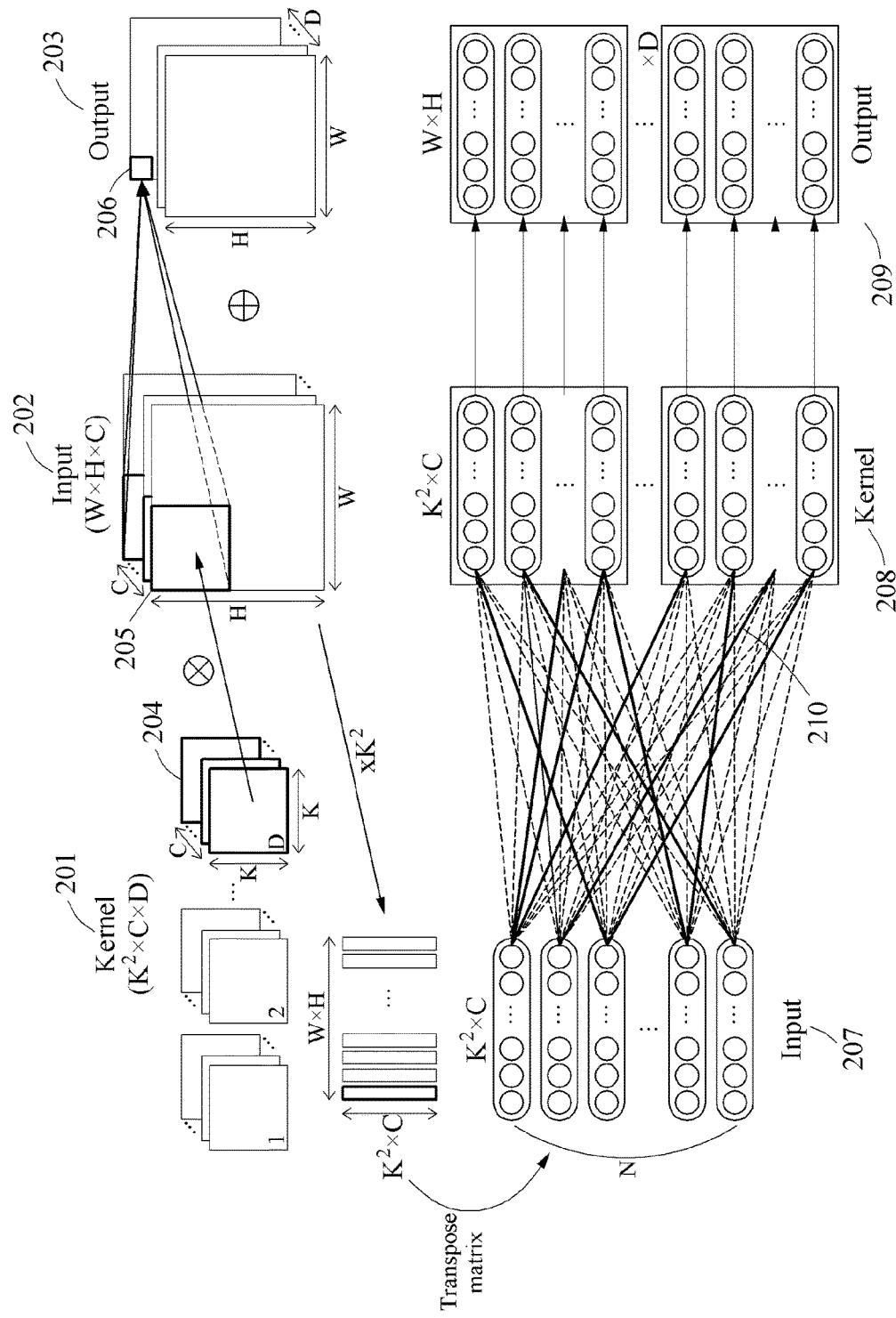
FIG. 2 is a diagram illustrating an example of a CNN processing operation.

FIG. 2 is a diagram illustrating an example of a CNN processing operation.

Referring to FIG. 2, a CNN processing apparatus generates an output 203 by performing a convolution operation between an input 202 and a kernel 201. A CNN includes a plurality of convolutional layers. The CNN processing apparatus performs the convolution operation for each of the convolutional layers. An output generated by each convolutional layer is used as an input of a subsequent convolutional layer. FIG. 2 illustrates an example of a convolution operation performed by one of the convolutional layers.

An input of a convolutional layer is data used as an input of the corresponding convolutional layer, and includes a feature map corresponding to an output generated by a previous layer or initial input data. For example, the input 202 of the convolutional layer is an initial input of the CNN, or an output of a previous convolutional layer. The input 202 of the convolutional layer may be generated by a subsampling layer that performs a rectified linear unit (ReLU) operation, or a rectified linear unit (ReLU) operation and a max pooling operation, on the output of the previous convolutional layer.

A size of the input 202 of the convolutional layer is W×H×C. The input 202 includes C input feature maps corresponding to C input channels, and each input feature map includes W×H input elements. A size of the kernel 201 of the convolutional layer is $K^2$×C×D. The kernel 201 includes D filters corresponding to D output channels. Each filter includes C kernel maps corresponding to C input channels, and each kernel map includes K×K kernel elements. The CNN processing apparatus generates the output 203 by sequentially performing the high speed convolution operation and the precision convolution operation between the input 202 and the kernel 201. The output 203 includes D output feature maps corresponding to D output channels, and each output feature map includes W×H output elements.

A size of the output feature map varies based on a size of padding applied to an input feature map and a size of a stride of a kernel map applied when performing the convolution operation.

Padding may be applied to the input 202. Padding is a scheme of adding elements having a predetermined value to the input feature map. The padding elements typically have a value of 0 and are typically added to one or more edges of the input feature map, but this may vary according to design intent.

In one example, the padding elements have a value of 0, a padding of 0 means that no padding elements are added to the input feature map, a padding of 1 means that a row or a column of padding elements having a value of 0 is added to each of the four edges of the input feature map, and a padding of 2 means that two rows or two columns of padding elements having a value of 0 are added to each of the four edges of the input feature map. A size of an input feature map to which padding is applied increases by a size of the padding. For example, the size of an input feature map having a size of W×H increases to (W+2)×(H+2) when a padding of 1 is added to the input feature map, and increases to (W+4)×(H+4) when a padding of 2 is added to the input feature map.

The stride is a sliding interval of a kernel when performing a convolution operation. A stride of 1 means that the kernel is slid by one element each time the elements of the kernel are multiplied by corresponding elements of the input feature map when performing the convolution operation, a stride of 2 means that the kernel is slid by two elements each time the elements of the kernel are multiplied by corresponding elements of the input feature map when performing the convolution operation, and so forth.

The CNN processing apparatus performs the high speed convolution operation and then performs the precision convolution operation to generate an output element 206. For example, before generating the output element 206, the CNN processing apparatus generates an approximate output by approximating an operation process of a two-dimensional (2D) matrix multiplication ⊗ between kernel elements 204 of C kernel maps of a D-th filter and input elements 205 corresponding to the output element 206 in C input feature maps and a 2D matrix-wise addition ⊕ between operation results. The scheme of approximating the operation process is referred to as the high speed convolution operation.

The CNN processing apparatus performs only a portion of ⊗ and ⊕ or changes an operation order to perform the high speed convolution operation. To generate the approximate output element 206, the CNN processing apparatus performs only operations (for example, ⊗ and ⊕) associated with a portion of kernel elements of each kernel map of the D-th filter, and determines whether a predefined condition is satisfied by comparing an operation result with a threshold. For example, the CNN processing apparatus performs the high speed convolution operation by performing an operation associated with a portion of kernel elements in a kernel map corresponding to one of the input channels, skipping an operation associated with a remaining portion of the kernel elements in the kernel map corresponding to the one input channel, and performing an operation associated with a portion of kernel elements in a kernel map corresponding to a subsequent input channel. The CNN processing apparatus generates an initial output element 206 by performing a first operation between a first portion of kernel elements in a first kernel map corresponding to a first input channel and at least one input element corresponding to the first portion of the kernel elements in the first kernel map, and storing the result of the first operation as the initial output element 206. After performing the first operation, the CNN processing apparatus updates the output element 206 by performing a second operation between a second portion of kernel elements in a second kernel map corresponding to a second input channel and at least one input element corresponding to the second portion of the kernel elements in the second kernel map, and adding the result obtained from the second operation to the initial output element 206. For example, the CNN processing apparatus determines whether to skip performing an operation on remaining portions of the kernel elements in the first kernel map by comparing the initial output element 206 with the threshold, and skipping the operation on the remaining portions of the kernel elements in the first kernel map in response to the initial output element 206 being less than the threshold. Also, for example, the CNN processing apparatus determines whether to skip performing an operation on remaining portions of kernel elements in the second kernel map by comparing the updated output element 206 with the threshold, and skipping the operation on the remaining portions of the kernel elements in the second kernel map in response to the updated output element 206 being less than the threshold.

For the high speed convolution operation, the CNN processing apparatus loads only a portion of kernel elements in each kernel map, and then loads only a portion of kernel elements in a subsequent kernel map. The portion of the kernel elements that is loaded may be modified in various ways according to a design intent. For example, as shown in FIG. 2, in a case in which a size of each kernel map is K×K kernel elements, a portion of kernel elements to be loaded for operation from each kernel map when performing the high speed convolution operation may be defined in various sizes, for example, 1×1, 1×3, 3×1, and 3×3 kernel elements, and the CNN processing apparatus loads sub-kernel maps having a size of 1×1, 1×3, 3×1, or 3×3 kernel elements from each kernel map having a size of K×K kernel elements and performs the operation.

For example, when it is assumed that K=3 in a kernel map having a size of K×K kernel elements, 1 convolution operation performed on the kernel map having the size of K×K=3×3 kernel elements produces the same result as 9 convolution operations performed on 9 sub-kernel maps each having a size of 1×1 kernel elements. The CNN processing apparatus generates an approximate output by performing a convolution operation on (9-n) sub-kernel maps each having a size of 1×1 kernel elements, and selects a survival network based on the approximate output. When performing a precision convolution operation using the selected survival network, the CNN processing apparatus generates an output by performing a convolution operation on only the n sub-kernel maps each having a size of 1×1 kernel elements that were not used in performing the high speed convolution operation on the (9-n) sub-kernel maps each having a size of 1×1 kernel elements. The CNN processing apparatus combines the output generated by performing the precision convolution operation and the approximate output generated by performing the high speed convolution operation, thereby obtaining an output of the originally intended convolution operation accurately and quickly. The sub-kernel maps may have various sizes such as 1×1, 1×3, and 3×1 kernel elements according to a design intent. Although this example is described based on a kernel map, the entire kernel may also be divided to perform the high speed convolution operation and the precision convolution operation.

The example of performing the high speed convolution operation using only a portion of kernel elements in a kernel map may be combined with various schemes, and examples of the high speed convolution operation will be described with reference to FIGS. 6 through 7C.

The CNN processing apparatus selects a survival network for the precision convolution operation based on the approximate output generated by the high speed convolution operation, and generates a final value of the output element 206 by performing the precision convolution operation between the kernel elements 204 and the input elements 205 using the selected survival network. The CNN processing apparatus performs the precision convolution operation using the operation processes of ⊗ and ⊕.

The CNN processing apparatus performs a high speed convolution operation and a precision convolution operation between an input 207 having a feature vector form and a kernel 208 having a feature vector form. A feature vector is a vector having a form suitable for performing a convolution operation. The CNN processing apparatus performs an operation between the input 207 having the feature vector form that represents the input 202 and the kernel 208 having the feature vector form that represents the kernel 201, and generates an output 209 having a feature vector form that represents the output 203. For example, the CNN processing apparatus uses a feature vector represented as a transpose matrix of the input 202. N in FIG. 2 is W×H. Hereinafter, references to an input, an output, and a kernel include an input, an output, and a kernel each having a feature vector form as illustrated in FIG. 2.

The CNN processing apparatus selects a survival network 210 based on a result of the high speed convolution operation between the input 207 and the kernel 208. The survival network 210 is a network contributing to a precision convolution operation, and includes a network remaining after eliminating a redundant network from a precision convolutional network. The redundant network is a network that is not associated with the precision convolution operation, i.e., a network that does not contribute to the precision convolution operation. That is, the precision convolutional network includes the survival network and the redundant network, but the precision convolution operation is performed using the survival network. The CNN processing apparatus obtains an index of at least one input element that contributes to the precision convolution operation and an index of at least one kernel element that contributes to the precision convolution operation based on the result of the high speed convolution operation. The CNN processing apparatus selects the survival network based on the obtained index of the input element and the obtained index of the kernel element.

Figure 3:
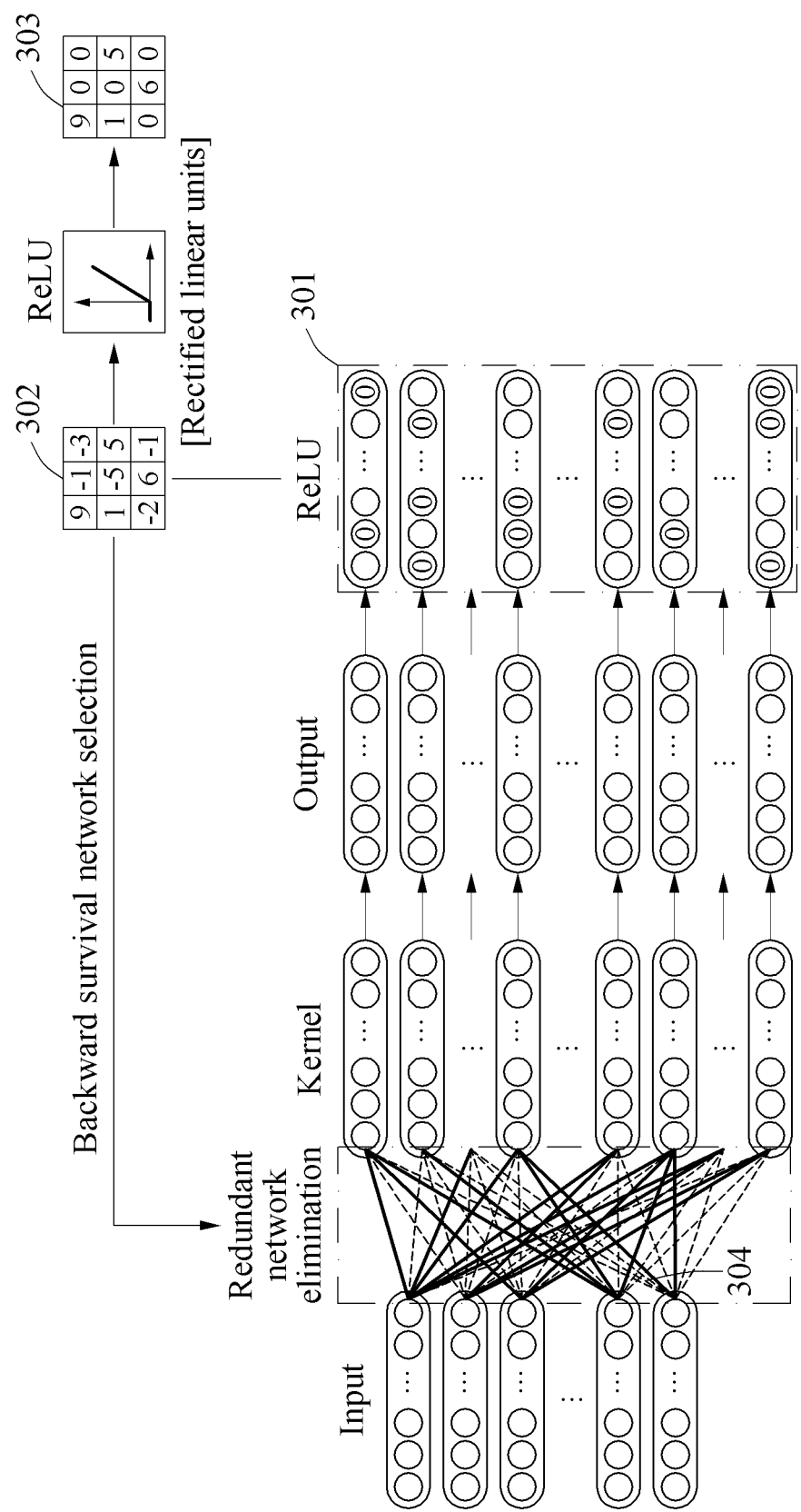
FIG. 3 is a diagram illustrating another example of a CNN processing operation.

FIG. 3 is a diagram illustrating another example of a CNN processing operation.

Referring to FIG. 3, a CNN processing apparatus backwardly selects a survival network 304 in a precision convolutional network based on a result of a high speed convolution operation. The CNN processing apparatus obtains an approximate output by performing a high speed convolution operation between an input and a kernel. An output of FIG. 3 is an approximate output generated by performing the high speed convolution operation. The CNN processing apparatus selects at least one output element contributing to a precision convolution operation from output elements of the approximate output. The CNN processing apparatus backwardly selects the survival network 304 associated with the selected at least one output element in the precision convolutional network. For example, the CNN processing apparatus backwardly selects the survival network 304 by selecting a path contributing to generation of the selected at least one output element. In another example, the CNN processing apparatus selects the survival network 304 by backwardly eliminating a redundant network not associated with the selected at least one output element from the precision convolutional network, i.e., a redundant network that does not contribute to generation of the selected at least one output element.

The CNN processing apparatus selects the survival network 304 based on a result 301 of an ReLU operation performed on the approximate output. A function of the ReLU operation is expressed by $F(x)=\max(0, x)$, in which $F(x)$ denotes a function value of the ReLU operation, x denotes a value of an output element of the approximate output, and max( ) denote a maximum function that outputs the greater of 0 and x. Thus, an output element of the approximate output having a negative value is output as 0 by the ReLU operation, and an output element of the approximate output having a value of 0 or a positive value is output as its actual value by the ReLU operation. For example, when an ReLU operation is performed on a feature map 302 of the approximate output, negative values of the feature map 302 of the approximate output are converted to 0 to generate a feature map 303 of the result 301 of the ReLU operation.

The CNN processing apparatus performs an ReLU operation on the output elements of the approximate output using an ReLU layer. The ReLU layer is used as an activation function of a high speed convolutional network. The CNN processing apparatus selects at least one output element having a non-zero value from output elements of the result 301 of the ReLU operation performed on the output elements of the approximate output. Referring to FIG. 3, at least one output element having a non-zero value is selected from the output elements having values of 9, 1, 5, and 6 in the feature map 303. In various examples, any one, any two, any three, or any four of the output elements having values of 9, 1, 5, and 6 may be selected. The CNN processing apparatus selects the survival network 304 associated with the selected at least one output element in the precision convolutional network. For example, the CNN processing apparatus selects at least one input element and at least one kernel element contributing to generation of the selected at least one output element, and selects a network associated with an operation between the selected at least one input element and the selected at least one kernel element.

In another example, the CNN processing apparatus performs a modified ReLU operation on the output elements of the approximate output. For example, the CNN processing apparatus performs a modified ReLU operation in which the ReLU function $F(x)=\max(0, x)$ is translated in parallel in an x-axis direction to obtain a modified ReLU function $F(x)=\max(0, x-x_0)$, in which $x_0$ denotes an amount by which the ReLU function $F(x)=\max(0, x)$ is translated in parallel in the x-axis direction. A positive value of $x_0$ denotes a translation in the positive x-axis direction, and a negative value of $x_0$ denotes a translation in the negative x-axis direction. The modified ReLU function $F(x)=\max(0, x-x_0)$ outputs the greater of 0 and $x-x_0$. The CNN processing apparatus may implement the modified ReLU operation by performing a comparison operation to determine whether the output elements of the approximate output are greater than a threshold $x_0$. If an output element of the approximate output is greater than the threshold $x_0$, the CNN processing apparatus outputs $x-x_0$ as an output element of a result of the modified ReLU operation. If the output element of the approximate output is less than or equal to the threshold $x_0$, the CNN apparatus outputs 0 as the output element of the result of the modified ReLU operation. The CNN processing apparatus selects at least one output element having a non-zero value from output elements of the approximate output determined to exceed the threshold in the comparison operation, i.e., from output elements of the result of the modified ReLU operation.

Although an example of using a modified ReLU function $F(x)=\max(0, x-x_0)$ obtained by translating the ReLU function $F(x)=\max(0, x)$ in parallel in the x-axis direction is described above, the ReLU function $F(x)=\max(0, x)$ may instead be translated in parallel in a y-axis direction to obtain a modified ReLU function $F(x)=\max(y_0, x)$, in which $y_0$ denotes an amount by which the ReLU function $F(x)=\max(0, x)$ is translated in parallel in the y-axis direction. A positive value of $y_0$ denotes a translation in the positive y-axis direction, and a negative value of $y_0$ denotes a translation in the negative y-axis direction. The modified ReLU function $F(x)=\max(y_0, x)$ outputs the greater of $y_0$ and x. The CNN processing apparatus selects at least one output element having a value greater than $y_0$ for selecting a survival network from output elements of the result of the modified ReLU function.

Although examples in which the ReLU function $F(x)=\max(0, x)$ is translated in parallel in either the x-axis direction or the y-axis direction are described above, the ReLU function $F(x)=\max(0, x)$ may instead be translated in parallel in both the x-axis direction and the y-axis direction to obtain a modified ReLU function $F(x)=\max(y_0, x-x_0)$ that outputs the greater of $y_0$ and $x-x_0$.

Figure 4:
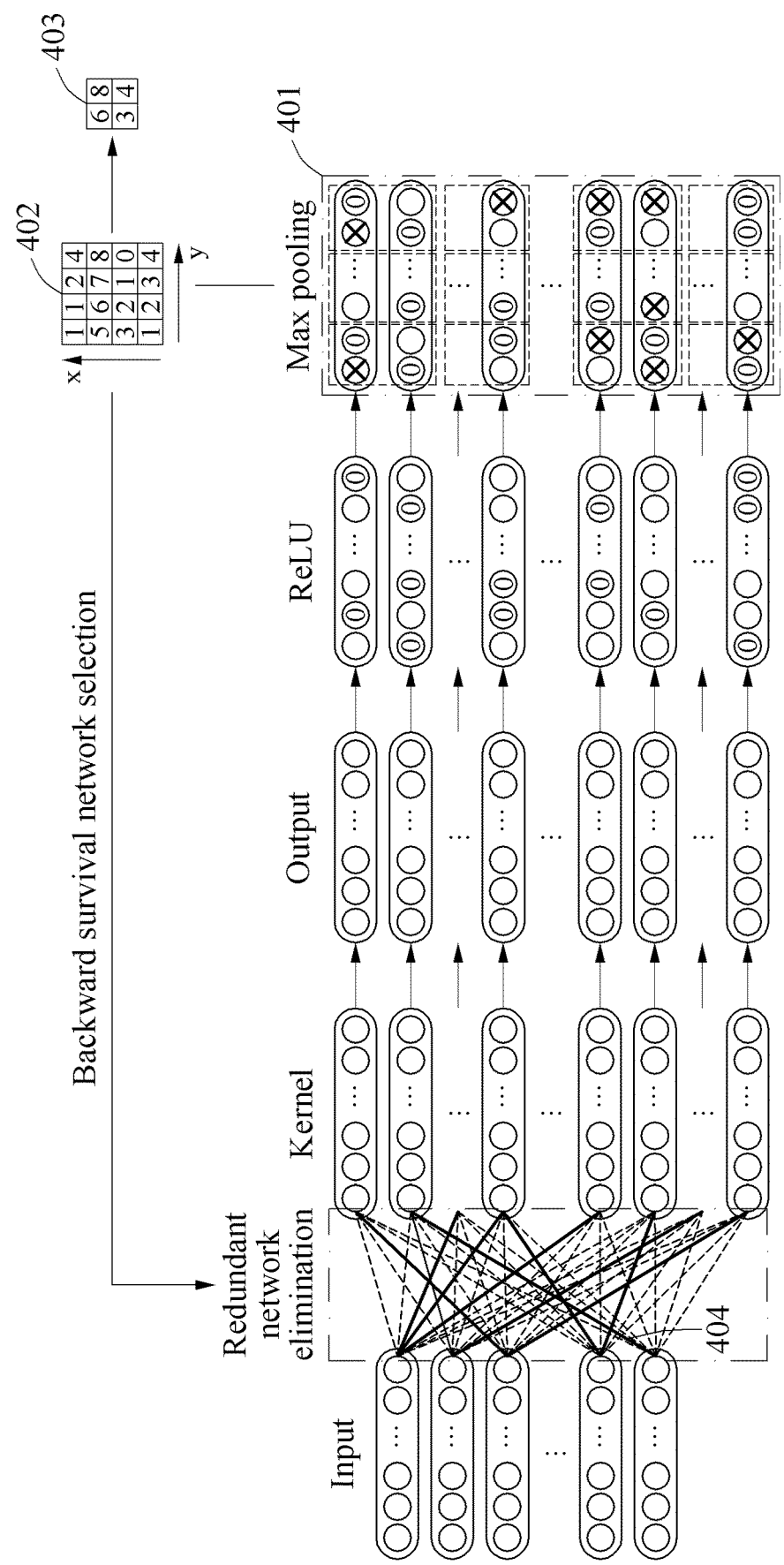
FIG. 4 is a diagram illustrating another example of a CNN processing operation.

FIG. 4 is a diagram illustrating another example of a CNN processing operation.

Referring to FIG. 4, a CNN processing apparatus backwardly selects a survival network 404 in a precision convolutional network using an ReLU operation and a max pooling operation. The CNN processing apparatus obtains an approximate output by performing a high speed convolution operation between an input and a kernel. An output of FIG. 4 is an approximate output generated by performing the high speed convolution operation.

As described with reference to FIG. 3, the CNN processing apparatus performs an ReLU operation on output elements of the approximate output using an ReLU layer. The CNN processing apparatus performs a max pooling operation on output elements of a result of the ReLU operation using a max pooling layer. The CNN processing apparatus selects at least one output element having a representative value representative of a region of output elements of the result of the ReLU operation from output elements of a result 401 of the max pooling operation, and selects the survival network 404 associated with the selected at least one output element in the precision convolutional network. Pooling or sampling is a scheme of reducing a resolution of a feature map. When a max pooling operation is performed on a feature map 402 having a resolution of 4×4 of the result of the ReLU operation, a feature map 403 having a resolution of 2×2 of the result 401 of the max pooling operation is generated from the feature map 402 having the resolution of 4×4 of the result of the ReLU operation. The value of each output element of the feature map 403 is a maximum value of output elements in a corresponding 2×2 region in the feature map 402, and is a representative value representative of the corresponding 2×2 region of output elements in the feature map 402. The max pooling operation may be modified and used in various ways according to a design intent based on a level of scaling.

The CNN processing apparatus performs a max pooling operation on the output elements of the result of the ReLU operation, and determines a value of an output element having a maximum value among 2×2 output elements of the ReLU operation to be a representative value representative of a region of the 2×2 output elements of the result of the ReLU operation. In FIG. 4, output elements of the result 401 of the max pooling operation marked "0" and "X" are remaining output elements excluding output elements having the representative value. The CNN processing apparatus selects at least one output element having the representative value from the result 401 of the max pooling operation (the output elements excluding the output elements marked "0" and "X"). Referring to FIG. 4, at least one output element is selected from the output elements having values of 6, 8, 3, and 4 in the feature map 403. In various examples, any one, any two, any three, or any four of the output elements having values of 6, 8, 3, and 4 may be selected.

The CNN processing apparatus selects the survival network 404 using the selected at least one output element. Since the number of output elements selected based on the result of the max pooling operation performed on the output elements of the ReLU operation is less than the number of output elements selected based on the result of the ReLU operation, the size of the survival network selected based on the ReLU layer and the max pooling layer is smaller than the size of the survival network selected based only on the ReLU layer.

In another example, the CNN processing apparatus may perform an operation on the output elements of the ReLU operation or the output elements of the approximate output by modifying the max pooling operation. For example, the CNN processing apparatus may replace the max pooling operation with an operation having a modified criterion for selecting a representative value of the max pooling operation. To accomplish this, the CNN processing apparatus groups output elements of the result of the ReLU operation into at least one group. The CNN processing apparatus selects an output element having a maximum value among output elements having non-zero values in the group, or an output element having a value less than the maximum value by a difference less than a threshold.

Although an example in which the operation performed before the modified max pooling operation is the ReLU operation is described above, an ReLU operation modified in the manner described above in connection with FIG. 3 may be used. For example, the CNN processing apparatus performs a comparison operation to determine whether the output elements of the approximate output exceed a first threshold, groups output elements of the approximate output determined to exceed the first threshold in the comparison operation into at least one group, and selects, from the output elements in the group, at least one output element having a maximum value among output elements having non-zero values in the group, or an output element having a value less than the maximum value by a difference less than a second threshold. The CNN processing apparatus selects the survival network 404 based on the selected at least one output element.

Figure 5:
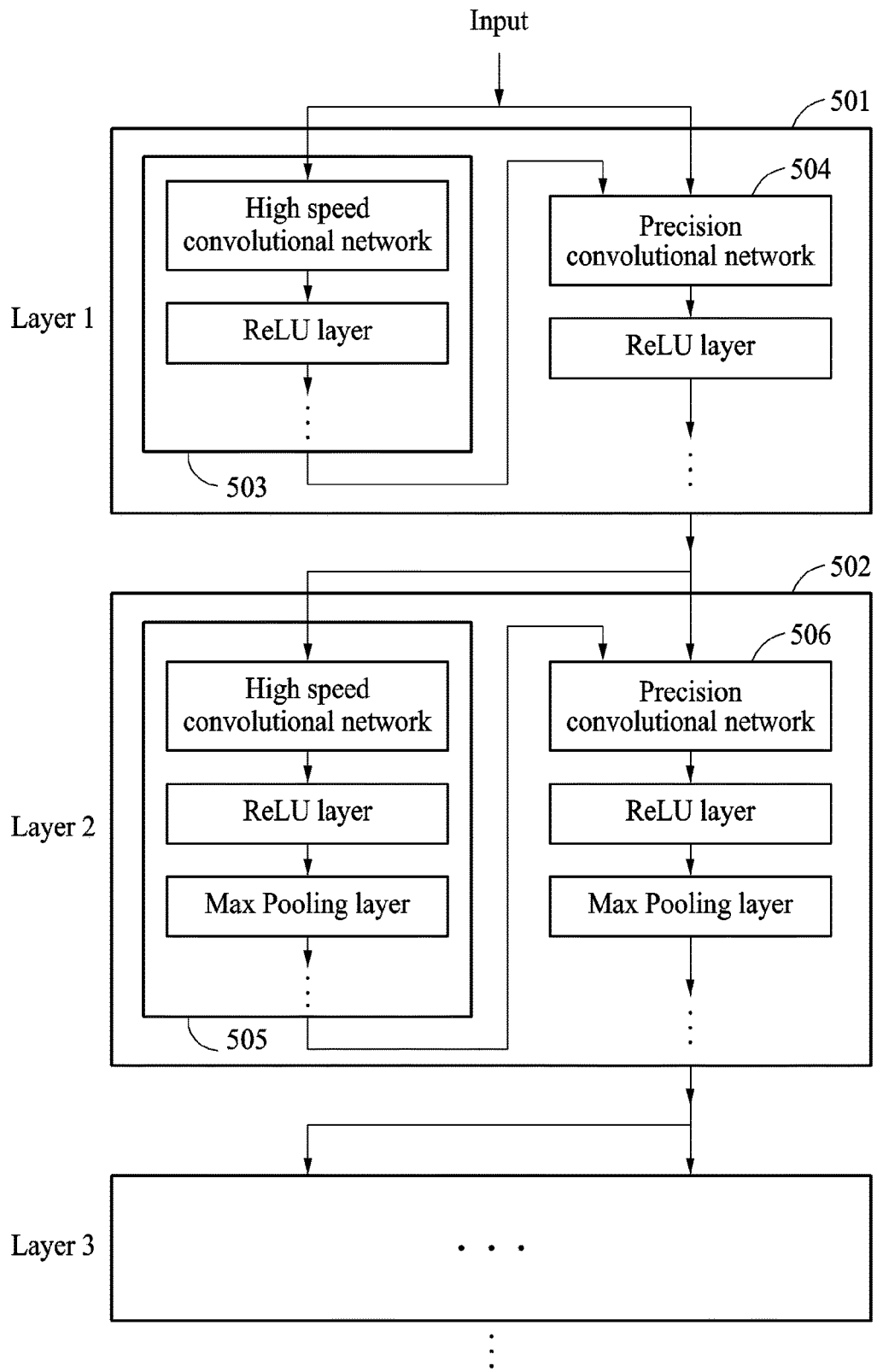
FIG. 5 is a block diagram illustrating an example of a CNN.

FIG. 5 is a block diagram illustrating an example of a CNN.

Referring to FIG. 5, a CNN includes a plurality of convolutional layers including Layer 1 (501), Layer 2 (502), Layer 3 . . . . The convolutional layer 501 includes a prediction network 503 and a precision convolutional network 504, and the convolutional layer 502 includes a prediction network 505 and a precision convolutional network 506. A CNN processing apparatus generates an index of a survival network corresponding to an input using the prediction networks 503 and 505. The CNN processing apparatus generates an output corresponding to the input and the index of the survival network using the precision convolutional networks 504 and 506. The index of the survival network is generated based on an index of an input element that contributes to a precision convolution operation and an index of a kernel element that contributes to the precision convolution operation. As described above, the CNN processing apparatus selects the survival network contributing to the approximate output using the prediction networks 503 and 505. A processing operation using the prediction networks 503 and 505 is used as a preprocessing operation of a processing operation using the precision convolutional networks 504 and 506.

The prediction networks 503 and 505 each include a high speed convolutional network and an ReLU layer, and the prediction network 505 further includes a max pooling layer. The CNN processing apparatus performs the high speed convolution operation using the high speed convolutional networks, and performs the precision convolution operation using the precision convolutional networks 504 and 506. The structure of the convolutional layers 501 and 502 illustrated in FIG. 5 is merely an example, and may be modified and applied in various ways according to design intent or a scheme to be used.

Figure 6:
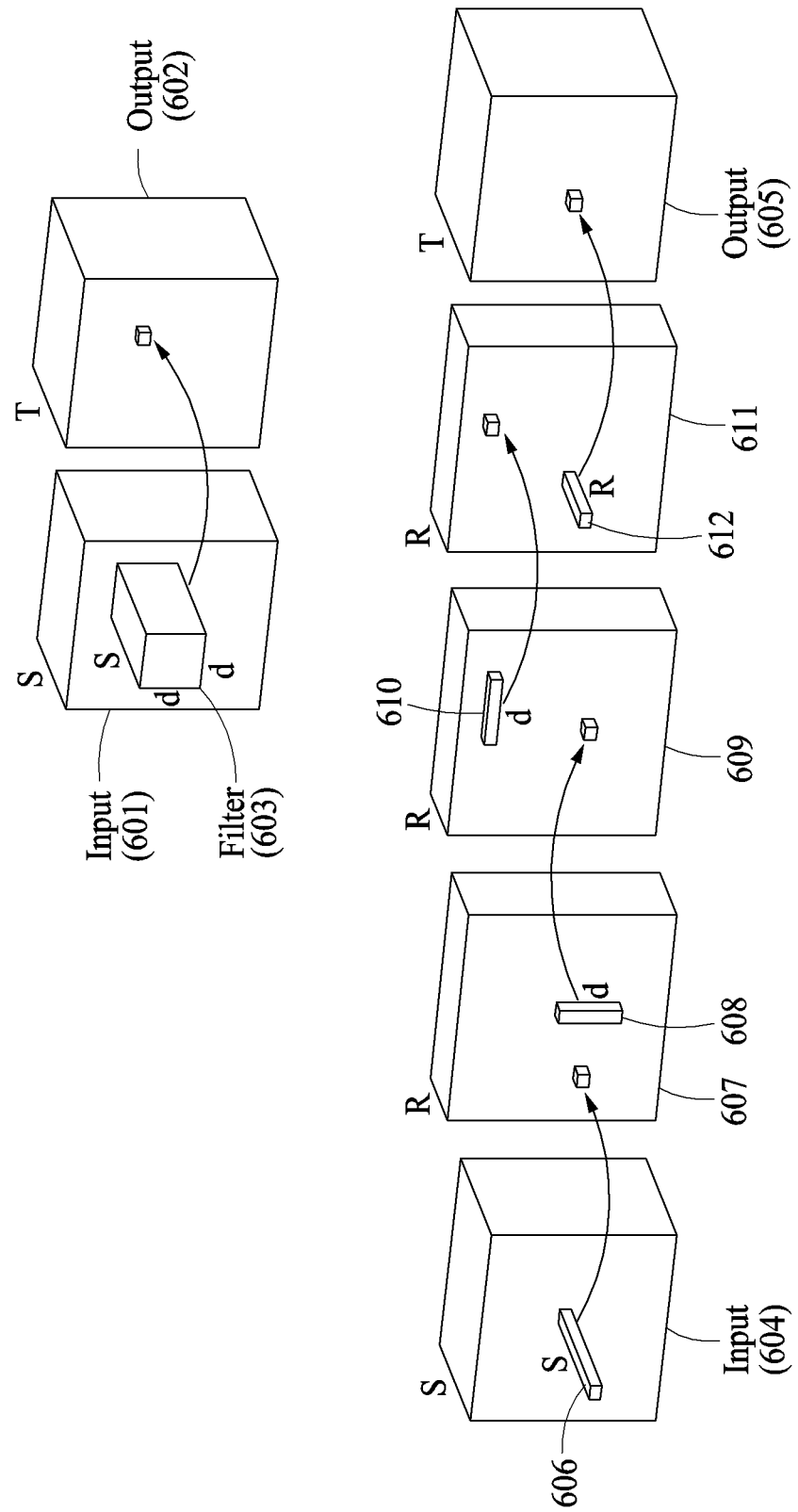
FIG. 6 is a diagram illustrating an example of a high speed convolution operation.

FIG. 6 is a diagram illustrating an example of a high speed convolution operation.

A CNN processing apparatus performs a high speed convolution operation between an input and a kernel by applying low-rank approximation scheme using a mathematical approximation model. The CNN processing apparatus performs the high speed convolution operation by sequentially performing convolution operations between the input and sub-kernels generated by decomposing the kernel. For example, the CNN processing apparatus sequentially performs the convolution operations by performing a first convolution operation between the input and a first sub-kernel, and performing a second convolution operation between a result of the first convolution operation and a second sub-kernel. The convolution operations performed on the sub-kernels correspond to an approximate convolution operation performed on the kernel, and thus are performed at a high speed.

Referring to FIG. 6, an example of the high speed convolution operation will be described on the assumption that a number of input channels of an input 601 is S, a size of each filter 603 of a kernel is d×d×S (a size of each kernel map is d×d), and a number of output channels of an output 602 is T (a number of filters is also T). The CNN processing apparatus performs a convolution operation between an input 604 and a first sub-kernel. The first sub-kernel includes R filters, and each filter 606 includes sub-kernel maps corresponding to input channels. The CNN processing apparatus performs the convolution operation using the first sub-kernel including the R filters, and thus generates a result 607 of the first convolution operation including R output channels.

The CNN processing apparatus performs a convolution operation between the result 607 of the first convolution operation and a second sub-kernel. The second sub-kernel includes R filters, and each filter 608 includes sub-kernel maps corresponding to input channels. The CNN processing apparatus performs the convolution operation using the second sub-kernel including the R filters, and thus generates a result 609 of the second convolution operation including R output channels.

The CNN processing apparatus performs a convolution operation between the result 609 of the second convolution operation and a third sub-kernel. The third sub-kernel includes R filters, and each filter 610 includes sub-kernel maps corresponding to input channels. The CNN processing apparatus performs the convolution operation using the third sub-kernel including the R filters, and thus generates a result 611 of the third convolution operation including R output channels.

The CNN processing apparatus performs a convolution operation between the result 611 of the third convolution operation and a fourth sub-kernel. The fourth sub-kernel includes T filters, and each filter 612 includes sub-kernel maps corresponding to input channels. The CNN processing apparatus performs the convolution operation using the fourth sub-kernel including the T filters, and thus generates an output 605 corresponding to a result of the fourth convolution operation including T output channels. The output 605 is an approximate output that approximates the output 602.

As described above, the CNN processing apparatus replaces a convolution operation performed on a kernel having a size of d×d×S×T with convolution operations performed on sub-kernels, simplifies the convolution operation by performing the high speed convolution operation on the sub-kernels, and increases an operating speed.

The sub-kernels are defined to minimize a difference between a result of the convolution operation performed between the input and the kernel and a result of the sequential convolution operations performed between the input and the sub-kernels (see Equation 1 below). The sub-kernels are also defined to minimize a difference between a result of an ReLU operation performed on the result of the convolution operation performed between the input and the kernel and a result of an ReLU operation performed on the result of the sequential convolution operations performed between the input and the sub-kernels (see Equation 2 below). The sub-kernels are also defined to minimize a difference between the result of the ReLU operation performed on the result of the convolution operation performed between the input and the kernel and the result of the sequential convolution operations performed between the input and the sub-kernels (see Equation 3 below). The CNN processing apparatus performs a much simplified high speed convolution operation using the sub-kernels in which the result of the ReLU operation is reflected.

The sub-kernels are obtained according to Equations 1 through 3 below.

$$\{C, K_Y, K_X\} = \text{Minimize} \|X \otimes K - X \otimes C \otimes K_Y \otimes K_X\|_2 \quad (1)$$

$$\{C, K_Y, K_X\} = \text{Minimize} \|ReLU(X \otimes K) - ReLU(X \otimes C \otimes K_Y \otimes K_X)\|_1 \quad (2)$$

$$\{C, K_Y, K_X\} = \text{Minimize} \|ReLU(X \otimes K) - X \otimes C \otimes K_Y \otimes K_X\|_1 \quad (3)$$

In Equations 1 through 3, C, $K_Y$, and $K_X$ denote sub-kernels, X denotes an input, K denotes a kernel, and ⊗ denotes a convolution operation. The convolution operation denoted by ⊗ in Equations 1 through 3 is different from the two-dimensional (2D) matrix multiplication denoted by ⊗ described with reference to FIG. 2. Furthermore, $\| \|_2$ denotes an L2-norm, $\| \|_1$ denotes an L1-norm, Minimize$\| \|_2$ denotes C, $K_Y$, and $K_X$ that minimize $\| \|_2$, and Minimize$\| \|_1$ denotes C, $K_Y$, and $K_X$ that minimize $\| \|_1$. However, the sub-kernels may be defined using various schemes, and thus are not limited to the above scheme or equations. For example, although three sub-kernels C, $K_Y$, and $K_X$ are obtained according to Equations 1 through 3, the equations may be extended to enable four or more sub-kernels to be obtained.

Figure 7A:
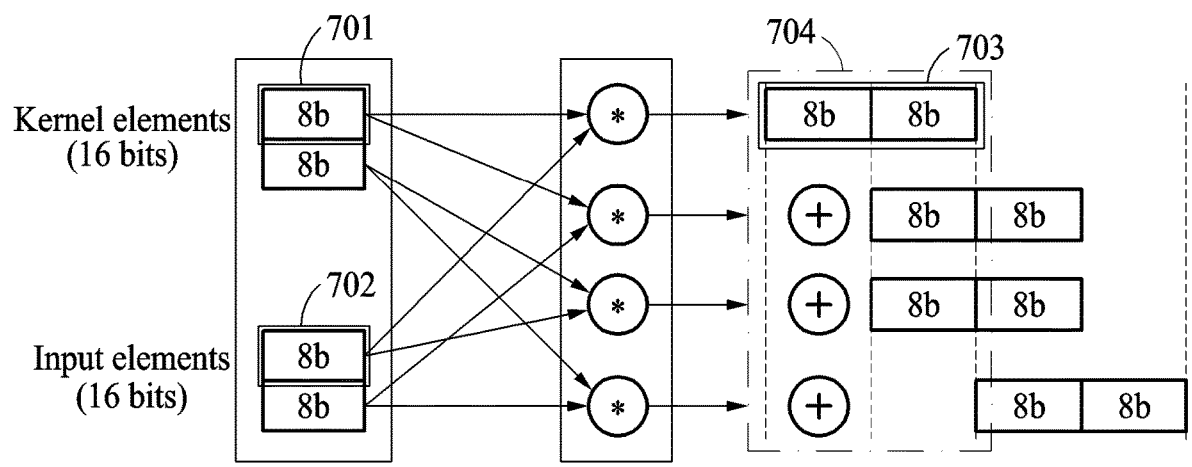
FIG. 7A is a diagram illustrating another example of a high speed convolution operation.
Figure 7B:
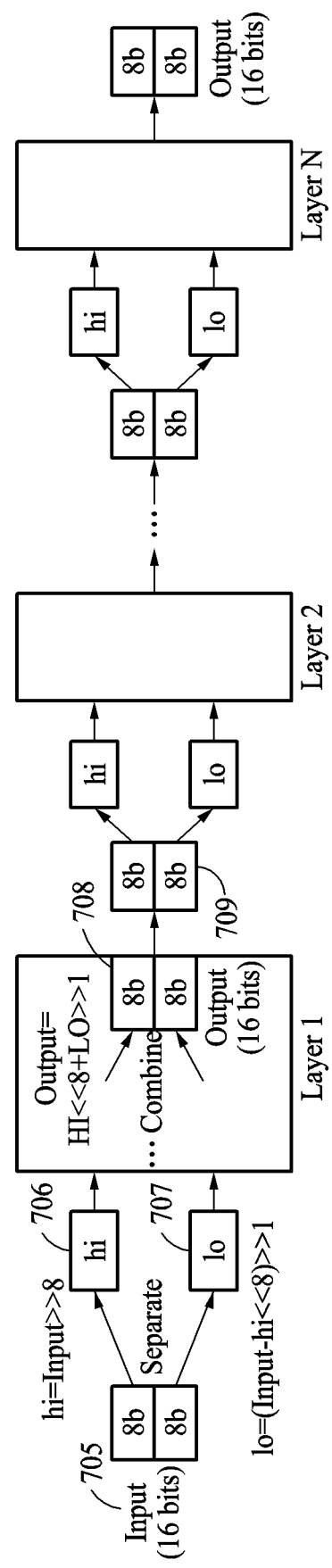
FIG. 7B is a diagram illustrating another example of a high speed convolution operation.

FIGS. 7A through 7C are diagrams illustrating other examples of a high speed convolution operation.

A CNN processing apparatus performs a high speed convolution operation using high-order bits of an input element of an input and high-order bits of a kernel element of a kernel. Referring to FIG. 7A, in a case in which kernel elements and input elements each are 16 bits, the CNN processing apparatus generates an approximate output 703 having 16 bits by performing a high speed convolution operation between 8 high-order bits 701 of the kernel elements and 8 high-order bits 702 of the input elements.

As described above, the CNN processing apparatus selects a survival network based on the approximate output 703 obtained by performing the high speed convolution operation, and performs a precision convolution operation using the survival network. For the precision convolution operation, the CNN processing apparatus performs a second convolution operation between the 8 high-order bits 701 of the kernel elements and 8 low-order bits of the input elements, performs a third convolution operation between 8 low-order bits of the kernel elements and the 8 high-order bits 702 of the input elements, and performs a fourth convolution operation between the 8 low-order bits of the kernel elements and the 8 low-order bits of the input elements. The CNN processing apparatus generates an output having 32 bits by combining the approximate output 703, a result of the second convolution operation, a result of the third convolution operation, and a result of the fourth convolution operation. The 16 high-order bits 704 of the 32-bit output of the combining operation is used as an input of a subsequent convolutional layer.

Referring to FIG. 7B, the CNN processing apparatus separates a 16-bit input 705 of a convolutional layer Layer 1 into a high-order bits input 706 corresponding to 8 high-order bits of the input 705 and a low-order bits input 707 corresponding to 8 low-order bits of the input 705. The CNN processing apparatus generates the high-order bits input 706 using Equation 4 below, and generates the low-order bits input 707 using Equation 5 below.

$$hi = \text{Input} >> 8 \quad (4)$$

$$lo = (\text{Input} - hi << 8) >> 1 \quad (5)$$

In Equations 4 and 5, hi denotes the high-order bits input 706, lo denotes the low-order bits input 707, Input denotes the input 705 of the convolutional layer, "<<" denotes a left shift operator, "<<8" denotes a left shift of 8 bits, ">>" denotes a right shift operator, and ">>1" denotes a right shift of 1 bit.

Although FIG. 7B illustrates an example in which the operation of separating the input 705 into the high-order bits input 706 and the low-order bits input 707 is performed outside the convolutional layer, in another example, the operation may be performed inside the convolutional layer.

The CNN processing apparatus performs a precision convolution operation using a precision convolutional network of the convolutional layer, and generates a 16-bit output 708 of the precision convolution operation by combining a result of an operation corresponding to 8 high-order bits of the output 708 performed by the precision convolution operation and a result of an operation corresponding to 8 low-order bits of the output 708 performed by the precision convolution operation. The CNN processing apparatus separates a kernel used for the high speed convolution operation or the precision convolution operation into a high-order bits kernel and a low-order bits kernel, and performs a convolution operation using the method described above with respect to FIG. 7A. The CNN processing apparatus generates the output 708 of the convolutional layer using Equation 6 below.

$$\text{Output} = HI << 8 + LO >> 1 \qquad (6)$$

In Equation 6, Output denotes the output 708 of the convolutional layer, HI denotes a result of an operation corresponding to 8 high-order bits of the output 708, "<<8" denotes a left shift of 8 bits, LO denotes a result of an operation corresponding to 8 low-order bits of the output 708, and ">>1" denotes a right shift of 1 bit.

The CNN processing apparatus generates the output 708 using a precision convolutional network of the convolutional layer Layer 1, and the output 708 is used as an input 709 of a subsequent convolutional layer Layer 2. The input 709 corresponds to a result of preprocessing the output 708, for example, sampling the output 708. This process continues until a last convolutional layer Layer N.

Referring to FIG. 7C, the CNN processing apparatus performs an ReLU operation on a result of a convolution operation between a high-order bits input 712 and a high-order bits kernel 711, and determines whether to perform convolution operations on a low-order bits input and a low-order bits kernel based on a result of the ReLU operation. Input elements and kernel elements of FIG. 7C are elements involved in generating an output element. To generate the output element, the CNN processing apparatus performs a high speed convolution operation corresponding to a high-order bits convolution operation 713 between the high-order bits input 712 and the high-order bits kernel 711. The CNN processing apparatus performs an ReLU operation 714 on a result of the high speed convolution operation, and determines whether to perform additional convolution operations for generating the output element based on a result of the ReLU operation 714. The CNN processing apparatus determines whether to perform a high-order bits/low-order bits convolution operation 716 between the high-order bits input 712 and a low-order bits kernel and/or a high-order bits/low-order bits convolution operation 716 between a low-order bits input and the high-order bits kernel 711 using a processing target position determiner 715. The processing target position determiner 715 determines whether to skip the high-order bits/low-order bits convolution operations 716 based on the result of the ReLU operation 714. In one example, the processing target position determiner 715 examines the value of the result of the ReLU operation 714, and determines whether to skip the high-order bits/low-order bits convolution operations 716 based on the value. In one example, the processing target position determiner 715 determines to skip the high-order bits/low-order bits convolution operations 716 in response to the value of the result of the ReLU operation 714 being a negative value. In operation 717, the CNN processing apparatus combines the result of the ReLU operation 714 and a result of the high-order bits/low-order bits convolution operations 716. The combination is the same as the combination described with reference to FIG. 7A. When the high-order bits/low-order bits convolution operations 716 are skipped, the results of the high-order bits/low-order bits convolution operations 716 are 0.

The CNN processing apparatus determines whether to perform a low-order bits convolution operation 719 between the low-order bits input and the low-order bits kernel using a processing target position determiner 718. The processing target position determiner 718 determines whether to skip the low-order bits convolution operation 719 based on the result of the combination performed in operation 717. In one example, the processing target position determiner 718 examines the value of the result of the combination performed in operation 717, and determines whether to skip the low-order bits convolution operation 719 based on the value. In one example, the processing target position determiner 718 determines to skip the low-order bits convolution operation 719 in response to the value of the result of the combination performed in operation 717 being a negative value. The CNN processing apparatus generates an output element by combining a result of the combination performed in operation 717 and a result of the low-order bits convolution operation 719 in operation 720. When the low-order bits convolution operation 719 is skipped, the results of the low-order bits convolution operation 719 is 0.

The example of selecting a survival network described above may be applied to the operations of determining whether the CNN processing apparatus is to skip the high-order bits/low-order bits convolution operations 716 and the low-order bits/low-order bits convolution operation 719.

The examples described with reference to FIGS. 6 through 7C may be applied to a high speed convolution operation, and the CNN processing apparatus may employ various types of high speed convolution operation schemes including an approximation algorithm of a matrix multiplication operation.

Figure 8:
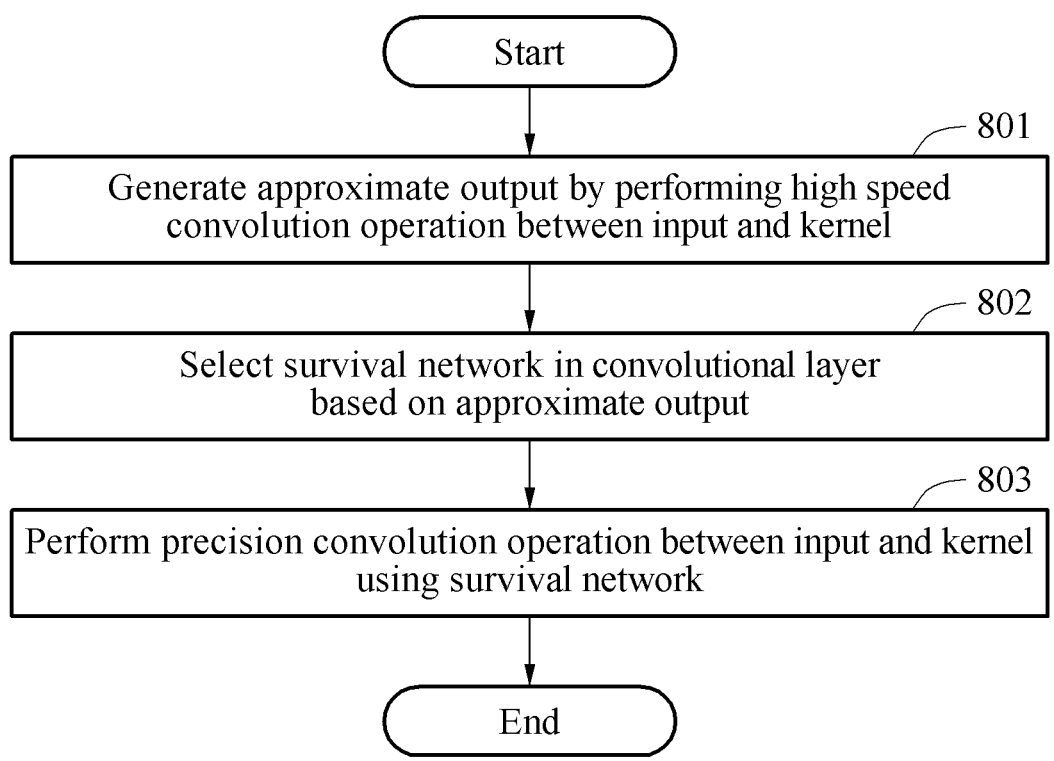
FIG. 8 is a flowchart illustrating another example of a CNN processing method.

FIG. 8 is a flowchart illustrating another example of a CNN processing method.

Referring to FIG. 8, in operation 801, a CNN processing apparatus generates an approximate output by performing a high speed convolution operation between an input and a kernel. In operation 802, the CNN processing apparatus selects a survival network in a convolutional layer based on the approximate output. In operation 803, the CNN processing apparatus performs a precision convolution operation between the input and the kernel using the survival network. The CNN processing apparatus may apply the method of FIG. 8 and the examples described above to a precision convolutional network.

Figure 9:
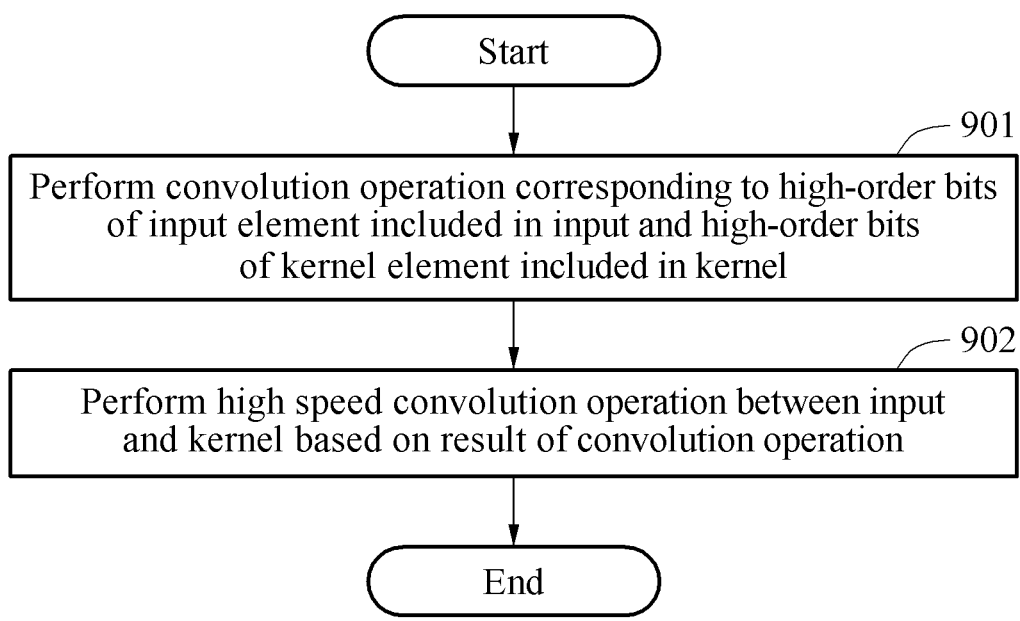
FIG. 9 is a flowchart illustrating another example of a CNN processing method.

FIG. 9 is a flowchart illustrating another example of a CNN processing method.

Referring to FIG. 9, in operation 901, a CNN processing apparatus performs a convolution operation between high-order bits of an input element of an input and high-order bits of a kernel element of a kernel. In operation 902, the CNN processing apparatus performs a high speed convolution operation between the input and the kernel based on a result of the convolution operation. The CNN processing apparatus performs convolution operations between input elements corresponding to high-order bits among the input elements and kernel elements corresponding to high-order bits among the kernel elements, and performs the high speed convolution operation by combining results of the convolution operations. The CNN processing apparatus may perform the high speed convolution operation using the method described with reference to FIGS. 7A through 7C, and may apply the examples described above to the high speed convolution operation.

Figure 10:
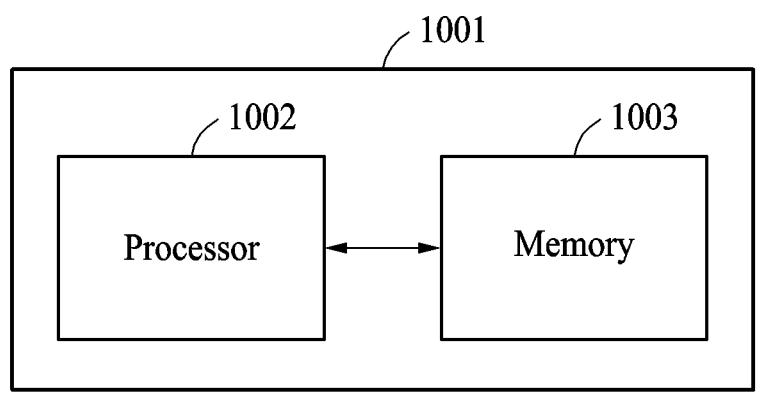
FIG. 10 is a block diagram illustrating an example of a CNN processing apparatus.

FIG. 10 is a block diagram illustrating an example of a CNN processing apparatus.

Referring to FIG. 10, a CNN processing apparatus 1001 includes a processor 1002 and a memory 1003. The processor 1002 implements at least one of the CNN processing apparatuses described with reference to FIGS. 1 through 8, or performs at least one of the CNN processing methods described with reference to FIGS. 1 through 9. The memory 1003 stores any one or any combination of any two or more of input feature maps of convolutional layers, kernel maps of convolutional layers, and a program including instructions that, when executed by the processor 1002, causes the processor 1002 to implement at least one of the CNN processing apparatuses described with reference to FIGS. 1 through 8 or perform at least one of the CNN processing methods described with respect to FIGS. 1 through 9. The memory 1003 may include either one or both of a volatile memory and a non-volatile memory.

The CNN processing apparatus 1001 may be connected to an external device, for example, a personal computer or a network, through an input/output device (not shown), and may exchange data with the external device.

The CNN processing apparatus 1001 may be used for a CNN accelerator that processes a CNN related operation at a high speed, a neural processing unit (NPU), or a vision processing unit (VPU) to control a corresponding dedicated processor. However, these are merely examples, and the CNN processing apparatus 1001 may use or be used for a variety of hardware according to design intent, and is not limited to the examples described above. When the examples are applied to CNN processing, memory requirements may be reduced and a processing speed may increase by reducing an operation count, for example, a count of memory access cycles (MACs), required for CNN processing. Thus, the examples described above are suitable for use in an embedded terminal or an environment having limited computing and memory resources.

The convolutional layers Layer 1 (501), Layer 2 (502), Layer 3 . . . , the prediction networks 503 and 505, the precision convolutional networks 504 and 506, the high speed convolutional networks, the ReLU layers, and the max pooling layers in FIG. 5, the convolutional layers Layer 1, Layer 2, . . . Layer N in FIG. 7B, the element that performs the high-order bits convolution operation 713, the element that performs the ReLU operation 714, the processing target position determiners 715 and 718, the element that performs the high-order bits/low-order bits convolution operations 716, the elements that perform the combining operations 717 and 720, and the element that performs the low-order bits convolution operation 719, and the CNN processing apparatus 1001, the processor 1002, and the memory 1003 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1, 8, and 9 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD–Rs, CD+Rs, CD–RWs, CD+RWs, DVD-ROMs, DVD–Rs, DVD+Rs, DVD–RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented convolutional neural network (CNN) processing method comprising:
    selecting a survival network in a precision convolutional network based on an attention result of a forward pass operation of the CNN subsequent to performing a high-speed convolution operation between a subset of bits for each of plural input elements of an input and a kernel using a high-speed convolutional network;
    performing a precision convolution operation between another subset of bits for each of the plural input elements of the input and the kernel using the survival network; and
    generating an output by combining the result of performing the high-speed convolution operation and a result of performing the precision convolution operation,
    wherein the kernel used in performing the high-speed convolution operation is also used in performing the precision convolution operation, and
    a convolutional layer in which the high-speed convolution operation is performed is the same as a convolutional layer in which the precision convolution operation is performed.

2. The method of claim 1, wherein the selecting comprises:
    obtaining an index of an input element and an index of a kernel element from the attention result of the forward pass operation, the input element and the kernel element each contributing to the precision convolution operation; and
    selecting the survival network based on the index of the input element and the index of the kernel element.

3. The method of claim 1, wherein the selecting comprises:
    obtaining an approximate output by performing the high-speed convolution operation;
    selecting an output element contributing to the precision convolution operation from output elements of the approximate output; and
    selecting a survival network associated with the selected output element in the precision convolutional network by removing operations of the convolution layer.

4. The method of claim 3, wherein the selecting of the output element comprises:
    performing a rectified linear unit (ReLU) operation, as the forward pass operation, on the output elements of the approximate output using an ReLU layer; and
    selecting an output element having a non-zero value from output elements of a result of the ReLU operation.

5. The method of claim 3, wherein the selecting of the output element comprises:
    performing a comparison operation to determine whether the output elements of the approximate output exceed a threshold; and
    selecting an output element having a non-zero value from output elements of the approximate output determined to exceed the threshold in the comparison operation.

6. The method of claim 3, wherein the selecting of the output element comprises:
    performing a rectified linear unit (ReLU) operation, as the forward pass operation, on the output elements of the approximate output using an ReLU layer;
    performing a max pooling operation on output elements of a result of the ReLU operation using a max pooling layer; and
    selecting, from output elements of a result of the max pooling operation, an output element having a representative value representative of a region of output elements of the result of the ReLU operation.

7. The method of claim 3, wherein the selecting of the output element comprises:
    performing a rectified linear unit (ReLU) operation, as the forward pass operation, on the output elements of the approximate output using an ReLU layer;
    grouping output elements of a result of the ReLU operation into at least one group; and selecting, from the output elements in the group, an output element having a maximum value among output elements having non-zero values in the group, or an output element having a value less than the maximum value by a difference less than a threshold.

8. The method of claim 3, wherein the selecting of the output element comprises:
performing a comparison operation to determine whether the output elements of the approximate output exceed a first threshold;
grouping output elements of the approximate output determined to exceed the first threshold in the comparison operation into at least one group; and
selecting, from the output elements in the group, an output element having a maximum value among output elements having non-zero values in the group, or an output element having a value less than the maximum value by a difference less than a second threshold.

9. The method of claim 1, wherein the selecting comprises:
obtaining an approximate output by performing the high-speed convolution operation;
selecting an output element contributing to the precision convolution operation from output elements of the approximate output; and
selecting the survival network by eliminating a redundant network not associated with the selected output element from the precision convolutional network.

10. The method of claim 1, wherein the selecting comprises performing the high-speed convolution operation by performing sequential convolution operations between the input and sub-kernels generated by decomposing the kernel.

11. The method of claim 10, wherein the performing of the sequential convolution operations comprises:
performing a first convolution operation between the input and a first sub-kernel of the sub-kernels; and
performing a second convolution operation between a result of the first convolution operation and a second sub-kernel of the sub-kernels.

12. The method of claim 10, wherein the sub-kernels are defined to minimize a difference between a result of a rectified linear unit (ReLU) operation, as the forward pass operation, performed on a result of the sequential convolution operations between the input and the sub-kernels and a result of an ReLU operation performed on a result of a convolution operation between the input and the kernel.

13. The method of claim 10, wherein the sub-kernels are defined to minimize a difference between a result of the sequential convolution operations between the input and the sub-kernels and a result of a rectified linear unit (ReLU) operation, as the forward pass operation, performed on a result of a convolution operation between the input and the kernel.

14. The method of claim 1, wherein the performing of the high-speed convolution operation comprises performing a convolution operation between high-order bits of an input element of the input and high-order bits of a kernel element of the kernel.

15. The method of claim 1, wherein the performing of the high-speed convolution operation comprises:
separating the input into a high-order bits input corresponding to high-order bits of the input and a low-order bits input corresponding to low-order bits of the input;
separating the kernel into a high-order bits kernel corresponding to high-order bits of the kernel and a low-order bits kernel corresponding to low-order bits of the kernel; and
performing a convolution operation between the high-order bits input and the high-order bits kernel.

16. The method of claim 15, wherein the performing of the precision convolution operation comprises:
performing a second convolution operation between the high-order bits input and the low-order bits kernel;
performing a third convolution operation between the low-order bits input and the high-order bits kernel;
performing a fourth convolution operation between the low-order bits input and the low-order bits kernel; and
combining a result of the high-speed convolution operation, a result of the second convolution operation, a result of the third convolution operation, and a result of the fourth convolution operation.

17. The method of claim 1, wherein the kernel comprises at least one filter;
the filter comprises at least one kernel map corresponding to at least one input channel, the kernel map comprising kernel elements;
the input comprises at least one input feature map corresponding to the input channel, the input feature map comprising input elements;
the performing of the high-speed convolution operation comprises:
performing a first operation between a first portion of kernel elements in a first kernel map corresponding to a first input channel and at least one input element corresponding to the first portion;
performing a second operation between a second portion of kernel elements in a second kernel map corresponding to a second input channel and at least one input element corresponding to the second portion after the first operation is performed; and
generating an output element corresponding to the first kernel map and the second kernel map based on a result of the first operation and a result of the second operation; and
the selecting comprises selecting the survival network based on the output element.

18. The method of claim 1, wherein the performing of the high-speed convolution operation comprises performing the high-speed convolution operation using an approximation algorithm of a matrix multiplication operation.

19. A non-transitory computer-readable medium storing instructions that, when executed by a processor, control the processor to perform the method of claim 1.

20. A processor-implemented convolutional neural network (CNN) processing method comprising:
generating an approximate output by performing a high-speed convolution operation between a subset of bits for each of plural input elements of an input and a kernel;
selecting a survival network in a convolutional layer based on the approximate output;
performing a precision convolution operation between another subset of bits for each of the plural input elements of the input and the kernel using the survival network; and
generating an output by combining a result of performing the high-speed convolution operation and a result of performing the precision convolution operation,
wherein the kernel used in performing the high-speed convolution operation is also used in performing the precision convolution operation, and a convolutional layer in which the high-speed convolution operation is performed is the same as a convolutional layer in which the precision convolution operation is performed.

21. The method of claim 20, wherein the selecting comprises:
    selecting an output element contributing to the precision convolution operation from output elements of the approximate output; and
    selecting a survival network associated with the selected output element from networks in the convolutional layer.

22. The method of claim 21, wherein the selecting of the survival network comprises selecting the survival network based on an input element associated with the selected output element and a kernel element associated with the selected output element.

23. The method of claim 21, wherein the selecting of the output element comprises:
    performing a rectified linear unit (ReLU) operation on the output elements of the approximate output using an ReLU layer; and
    selecting an output element having a non-zero value from output elements of a result of the ReLU operation.

24. The method of claim 21, wherein the selecting of the output element comprises:
    performing a comparison operation to determine whether the output elements of the approximate output exceed a threshold; and
    selecting an output element having a non-zero value from output elements of the approximate output determined to exceed the threshold in the comparison operation.

25. The method of claim 21, wherein the selecting of the output element comprises:
    performing a rectified linear unit (ReLU) operation on the output elements of the approximate output using an ReLU layer;
    performing a max pooling operation on output elements of a result of the ReLU operation using a max pooling layer; and
    selecting, from output elements of a result of the max pooling operation, an output element having a representative value representative of a region of output elements of the result of the ReLU operation.

26. The method of claim 21, wherein the selecting of the output element comprises:
    performing a rectified linear unit (ReLU) operation on the output elements of the approximate output using an ReLU layer;
    grouping output elements of a result of the ReLU operation into at least one group; and
    selecting, from the output elements in the group, an output element having a maximum value among output elements having non-zero values in the group, or an output element having a value less than the maximum value by a difference less than a threshold.

27. The method of claim 21, wherein the selecting of the output element comprises:
    performing a comparison operation to determine whether the output elements of the approximate output exceed a first threshold;
    grouping output elements of the approximate output determined to exceed the first threshold in the comparison operation into at least one group; and
    selecting, from the output elements in the group, an output element having a maximum value among output elements having non-zero values in the group, or an output element having a value less than the maximum value by a difference less than a second threshold.

28. The method of claim 20, wherein the generating of the approximate output comprises performing sequential convolution operations between the input and sub-kernels generated by decomposing the kernel.

29. The method of claim 20, wherein the generating of the approximate output comprises generating the approximate output based on high-order bits of an input element of the input and high-order bits of a kernel element of the kernel.

30. The method of claim 20, wherein the kernel comprises at least one filter;
    the filter comprises at least one kernel map corresponding to at least one input channel, the kernel map comprising kernel elements;
    the input comprises at least one input feature map corresponding to the input channel, the input feature map comprising input elements;
    the generating of the approximate output comprises:
        performing a first operation between a first portion of kernel elements in a first kernel map corresponding to a first input channel and at least one input element corresponding to the first portion;
        performing a second operation between a second portion of kernel elements in a second kernel map corresponding to a second input channel and at least one input element corresponding to the second portion after the first operation is performed; and
        generating an output element corresponding to the first kernel map and the second kernel map based on a result of the first operation and a result of the second operation; and
    the selecting comprises selecting the survival network in the convolutional layer based on the output element.

31. A processor-implemented convolutional neural network (CNN) processing method, the method comprising:
    selecting a survival network in a precision convolutional network based on an attention result of a forward pass operation of the CNN subsequent to perform a high-speed convolution operation between high-order bits of an input and high-order bits of a kernel while ignoring low-order bits of the input and low-order bits of the kernel;
    performing a precision convolution operation based on at least the low-order bits of the input and the low-order bits of the kernel; and
    generating an output by combining a result of performing the high-speed convolution operation and a result of performing the precision convolution operation,
    wherein the kernel used in performing the high-speed convolution operation is also used in performing the precision convolution operation, and
    wherein a convolutional layer in which the high-speed convolution operation is med is the same as a convolutional layer in which the precision convolution a oration is performed.

32. The method of claim 31, further comprising:
    separating the input into a high-order bits input corresponding to the high-order bits of the input and a low-order bits input corresponding to the low-order bits of the input; and
    separating the kernel into a high-order bits kernel corresponding to the high-order bits of the kernel and a low-order bits kernel corresponding to the low-order bits of the kernel, wherein the performing of the high-speed convolution operation comprises performing a first convolution operation between the high-order bits input and the high-order bits kernel, and the performing of the precision convolution operation comprises performing the precision convolution based on at least the low-order bits input and the low-order bits kernel.

33. The method of claim 32, wherein the performing of the precision convolution operation further comprises:

performing a second convolution operation between the high-order bits input and the low-order bits kernel;

performing a third convolution operation between the low-order bits input and the high-order bits kernel; and performing a fourth convolution operation between the low-order bits input and the low-order bits kernel, and the method further comprises generating a convolution output by combining a result of the first convolution operation, a result of the second convolution operation, a result of the third convolution operation, and a result of the fourth convolution operation.

34. A convolutional neural network (CNN) processing apparatus comprising:

a processor configured to:
select a survival network in a precision convolutional network based on a result of performing a high-speed convolution operation between a subset of bits for each input element of an input and a kernel using a high-speed convolutional network;
perform a precision convolution operation between another subset of bits for the each input element of the input and the kernel using the survival network; and
generate an output by combining the result of performing the high-speed convolution operation and a result of performing the precision convolution operation,
wherein the kernel used in performing the high-speed convolution operation is also used in performing the precision convolution operation, and
a convolutional layer in which the high-speed convolution operation is performed is the same as a convolutional layer in which the precision convolution operation is performed.

35. A convolutional neural network (CNN) processing apparatus comprising:

a processor configured to:
generate an approximate output by performing a high-speed convolution operation between a subset of bits for each of plural input elements of an input and a kernel;
select a survival network in a convolutional layer based on the approximate output;
perform a precision convolution operation between another subset of bits for each of the plural input elements of the input and the kernel using the survival network; and
generate an output by combining a result of performing the high-speed convolution operation and a result of performing the precision convolution operation,
wherein the kernel used in performing the high-speed convolution operation is also used in performing the precision convolution operation, and
a convolutional layer in which the high-speed convolution operation is performed is the same as a convolutional layer in which the precision convolution operation is performed.

36. A convolutional neural network (CNN) processing apparatus, comprising:

a processor configured to:
selecting a survival network in a precision convolutional network based on an attention result of a forward pass operation of the CNN subsequent to perform a high-speed convolution operation between high-order bits of an input and high-order bits of a kernel while ignoring low-order bits of the input and low-order bits of the kernel;
perform a precision convolution operation based on at least the low-order bits of the input and the low-order bits of the kernel; and
generate an output by combining a result of performing the high-speed convolution operation and a result of performing the precision convolution operation,
wherein the kernel used in performing the high-speed convolution operation is also used in performing the precision convolution operation, and
wherein a convolutional layer in which the high-speed convolution operation is performed is the same as a convolutional layer in which the precision convolution operation is performed.

37. A convolutional neural network (CNN) processing apparatus comprising:

a processor configured to:
generating an approximate output by performing a first convolution operation between a first part of an input and a first part of a kernel;
selecting a survival network in a convolutional layer based on the approximate output;
dependent on the performed first convolution operation, determine whether a result of the first convolution operation meets a predetermined criterion; and
perform a second convolution operation between a second part of the input and a second part of the kernel in response to a result of the determination being that the first convolution operation meets the predetermined criterion,
wherein the kernel used in performing the first convolution operation is also used in performing the second convolution operation, and
wherein a convolutional layer in which the first convolution operation is performed is the same as a convolutional layer in which the second convolution operation is performed.

38. The apparatus of claim 37, wherein a combination of the first part of the input and the second part of the input is an entirety of the input; and a combination of the first part of the kernel and the second part of the kernel is an entirety of the kernel.

39. The apparatus of claim 38, wherein a sum of processing resources required to perform the first convolution operation and processing resources required to perform the second convolution operation is less than processing resources required to perform a convolution operation between the entirety of the input and the entirety of the kernel.

40. The apparatus of claim 38, wherein a sum of a processing time required to perform the first convolution operation and a processing time required to perform the second convolution operation is less than a processing time required to perform a convolution operation between the entirety of the input and the entirety of the kernel.

41. The apparatus of claim 37, wherein the first part of the input is high-order bits of the input;

the first part of the kernel is high-order bits of the kernel;

the second part of the input is low-order bits of the input; and the second part of the kernel is low-order bits of the kernel.

42. The apparatus of claim 37, wherein the kernel comprises a kernel map having a size of K×K kernel elements; and the first part of the kernel is a sub-kernel map having a size of 1×1 or 1×K or K×1 kernel elements selected from the K×K kernel elements of the kernel map.

43. The apparatus of claim 37, wherein the input is an image or a voice; and the processor is further configured to perform a recognition operation or an authentication operation based on a combination of a result of the first convolution operation and a result of the second convolution operation.

* * * * *